United States Patent
Aoyagi

(10) Patent No.: US 8,570,627 B2
(45) Date of Patent: Oct. 29, 2013

(54) IMAGE PROCESSING APPARATUS FOR DATA COMPRESSION, CONTROL METHOD, AND COMPUTER-READABLE MEDIUM

(75) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 13/159,312

(22) Filed: Jun. 13, 2011

(65) Prior Publication Data

US 2011/0317232 A1 Dec. 29, 2011

(30) Foreign Application Priority Data

Jun. 24, 2010 (JP) ................................ 2010-143922

(51) Int. Cl.
G03F 3/08 (2006.01)
H04N 1/46 (2006.01)

(52) U.S. Cl.
USPC .......................................... 358/518; 358/512

(58) Field of Classification Search
None
See application file for complete search history.

(56) References Cited

U.S. PATENT DOCUMENTS

2008/0131013 A1* 6/2008 Suino et al. ................... 382/240
2009/0245661 A1* 10/2009 Ilbery ............................ 382/233
2010/0098333 A1 4/2010 Aoyagi ......................... 382/166

FOREIGN PATENT DOCUMENTS

JP 2000-278528 10/2000

* cited by examiner

Primary Examiner — Douglas Tran
(74) Attorney, Agent, or Firm — Fitzpatrick, Cella, Harper & Scinto

(57) ABSTRACT

An image processing apparatus comprises: an unit configured to compress image data based on values of pixels and a layout of the pixels for each tile including the predetermined number of pixels; an unit configured to calculate a representative value from the values of the pixels included in the tile; an unit configured to determine based on a distribution of the representative values of tiles included in a first area including the first number of tiles whether or not a tile of interest included in the first area is to be corrected; an unit configured to calculate a correction value for the tile of interest based on the representative values of tiles included in a second area including the second number of tiles; and an unit configured to add representative values of the tiles, determination results of the tiles, and the correction value to the image data compressed.

16 Claims, 37 Drawing Sheets

FIG. 3
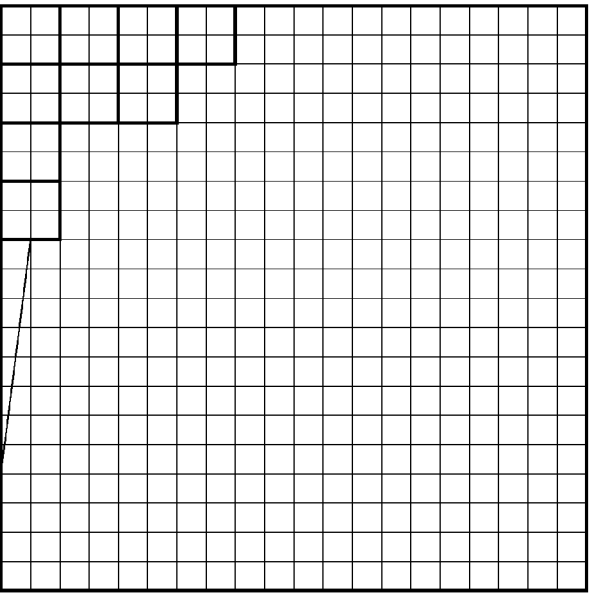
IMAGE
| | |
|---|---|
|  | ALL PIXELS = IDENTICAL COLOR : 1 COMBINATION |
|  | TWO COLORS: 7 COMBINATIONS |
| 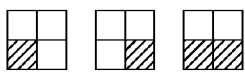 | THREE COLORS: 6 COMBINATIONS |
| 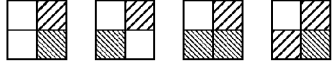 | ALL PIXELS = DIFFERENT COLORS : 1 COMBINATION |

FIG. 4
| IMAGE | FLAG |
|:---:|:---:|
|  | 0 |
|  | 1 |
|  | 2 |
|  | 3 |
|  | 4 |
|  | 5 |
|  | 6 |
|  | 7 |
|  | 8 |
|  | 9 |
|  | A |
|  | B |
|  | C |
|  | D |
|  | E |

FIG. 6

| IMAGE | 1-2 bit 0 | 1-3 bit 1 | 1-4 bit 2 | 2-3 bit 3 | 2-4 bit 4 | 3-4 bit 5 | PATTERN FLAG |
|---|---|---|---|---|---|---|---|
| | 1 | 1 | 1 | 1 | 1 | 1 | 0 |
| | 0 | 1 | 1 | 0 | 0 | 1 | 1 |
| | 0 | 0 | 1 | 1 | 0 | 0 | 2 |
| | 0 | 1 | 0 | 0 | 1 | 0 | 3 |
| | 0 | 0 | 0 | 1 | 1 | 1 | 4 |
| | 1 | 0 | 1 | 0 | 1 | 0 | 5 |
| | 1 | 1 | 0 | 1 | 0 | 0 | 6 |
| | 1 | 0 | 0 | 0 | 0 | 1 | 7 |
| | 0 | 1 | 0 | 0 | 0 | 0 | 8 |
| | 0 | 0 | 1 | 0 | 0 | 0 | 9 |
| | 0 | 0 | 0 | 0 | 0 | 1 | A |
| | 0 | 0 | 0 | 1 | 0 | 0 | B |
| | 0 | 0 | 0 | 0 | 1 | 0 | C |
| | 1 | 0 | 0 | 0 | 0 | 0 | D |
| | 0 | 0 | 0 | 0 | 0 | 0 | E |

Cell layout reference: 
| 1 | 2 |
|---|---|
| 3 | 4 |

COMPARISON RESULT

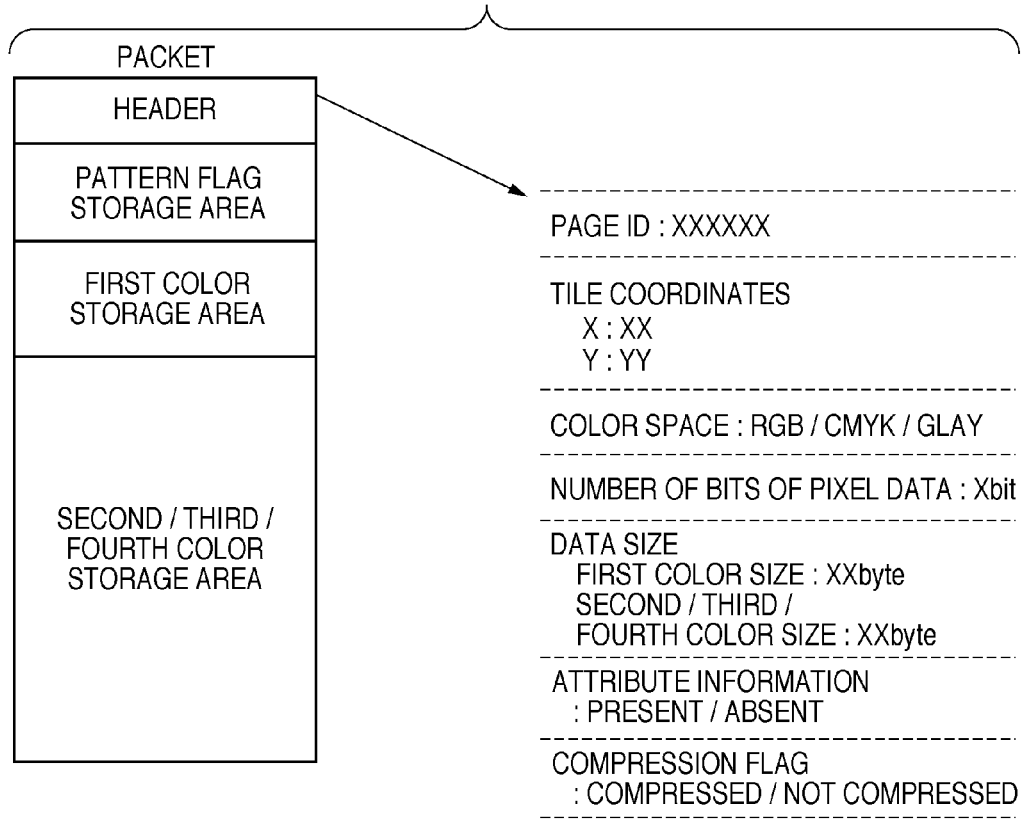

BWave(M, N) → AVERAGE VALUE OF BW IN TILE(M, N)

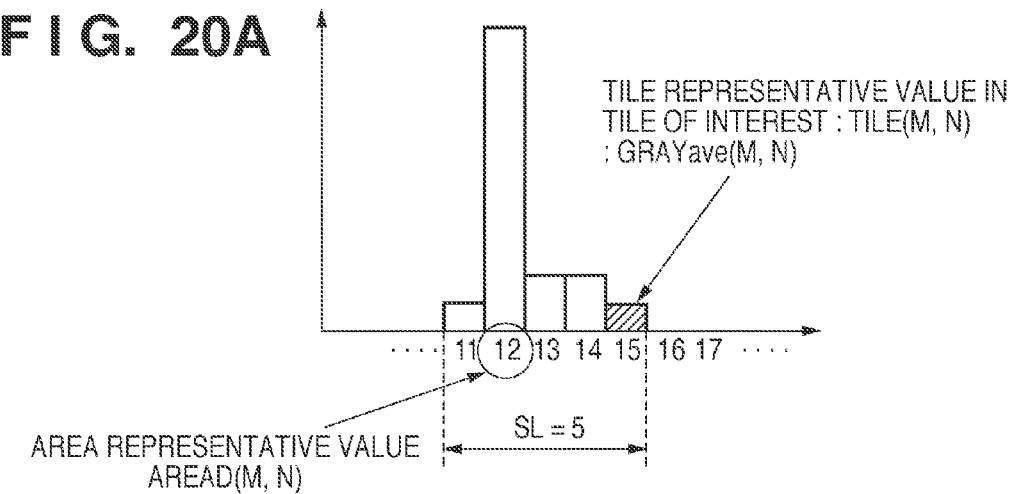
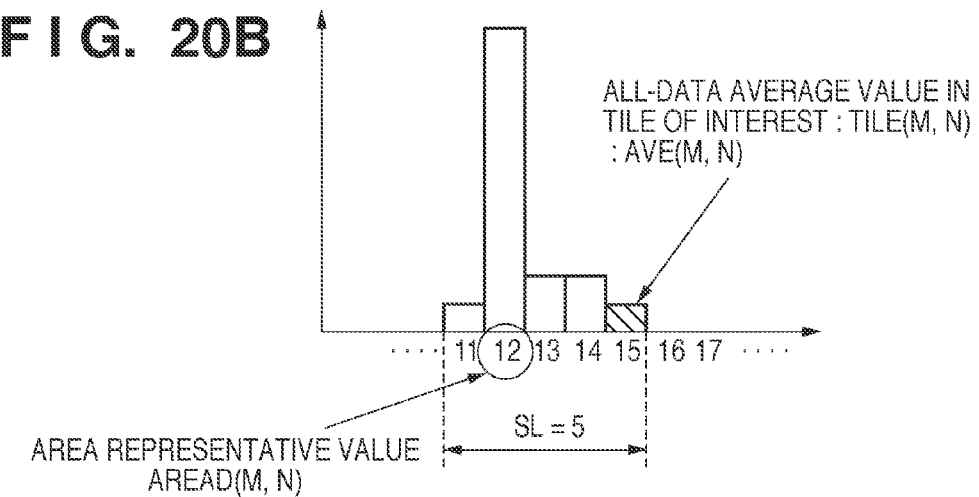
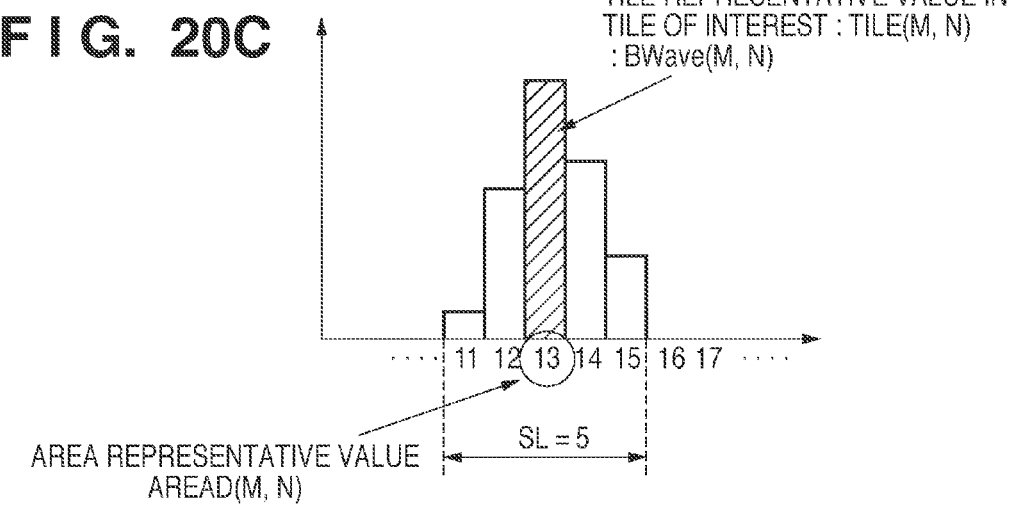

FIG. 23A

COMPRESSED IMAGE DATA
- TOP HEADER
- PACKET AT COORDINATES (0, 0)
- PACKET AT COORDINATES (1, 0)
- PACKET AT COORDINATES (2, 0)
- ⋮
- PACKET AT COORDINATES (0, 1)
- PACKET AT COORDINATES (1, 1)
- PACKET AT COORDINATES (2, 1)
- ⋮
- PACKET AT COORDINATES (x, y)

PAGE ID : XXXXXX

NUMBER OF TILES
  X : x
  Y : y

COLOR SPACE : RGB / CMYK / GRAY

NUMBER OF BITS OF PIXEL DATA : Xbit

GRAY CORRECTION VALUE : BWH

FIG. 23B

COMPRESSED IMAGE DATA
- TOP HEADER
- PACKET AT COORDINATES (0, 0)
- PACKET AT COORDINATES (1, 0)
- PACKET AT COORDINATES (2, 0)
- ⋮
- PACKET AT COORDINATES (0, 1)
- PACKET AT COORDINATES (1, 1)
- PACKET AT COORDINATES (2, 1)
- ⋮
- PACKET AT COORDINATES (x, y)

PAGE ID : XXXXXX

NUMBER OF TILES
  X : x
  Y : y

COLOR SPACE : RGB / CMYK

NUMBER OF BITS OF PIXEL DATA : Xbit

RGB CORRECTION VALUES :
  R : RH
  G : GH
  B : BH

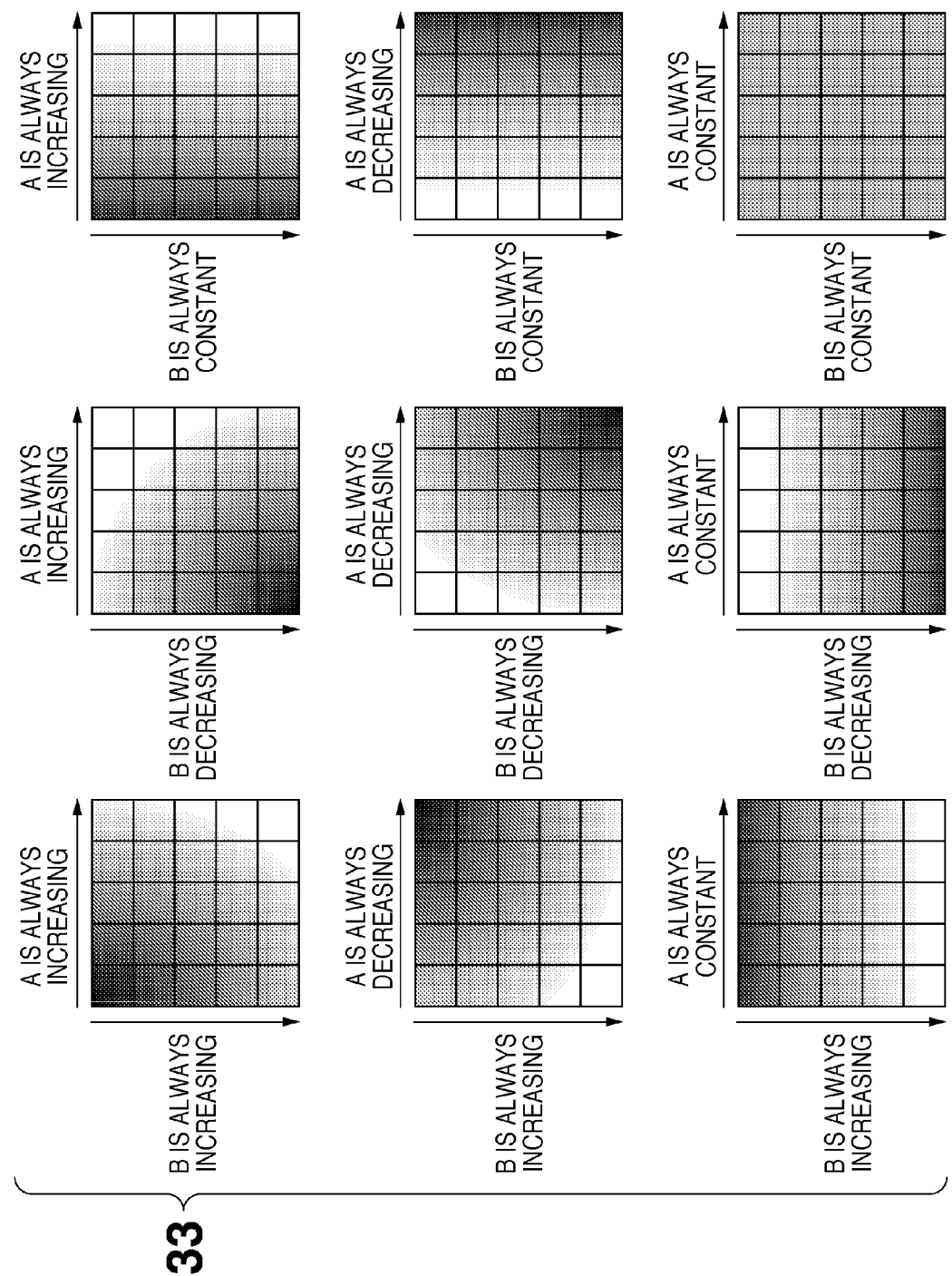
F I G. 33

FIG. 34A

| | | A | | |
|---|---|---|---|---|
| BWave (M−2,N−2) | BWave (M−1,N−2) | BWave (M,N−2) | BWave (M+1,N−2) | BWave (M+2,N−2) | ← (A−2)-TH ROW
| BWave (M−2,N−1) | BWave (M−1,N−1) | BWave (M,N−1) | BWave (M+1,N−1) | BWave (M+2,N−1) | ← (A−1)-TH ROW
| BWave (M−2,N) | BWave (M−1,N) | BWave (M,N) | BWave (M+1,N) | BWave (M+2,N) | ← (A)-TH ROW
| BWave (M−2,N+1) | BWave (M−1,N+1) | BWave (M,N+1) | BWave (M+1,N+1) | BWave (M+2,N+1) | ← (A+1)-TH ROW
| BWave (M−2,N+2) | BWave (M−1,N+2) | BWave (M,N+2) | BWave (M+1,N+2) | BWave (M+2,N+2) | ← (A+2)-TH ROW B (vertical)

FIG. 34B

| BWave (M−2,N−2) | BWave (M−1,N−2) | BWave (M,N−2) | BWave (M+1,N−2) | BWave (M+2,N−2) |
|---|---|---|---|---|
| BWave (M−2,N−1) | BWave (M−1,N−1) | BWave (M,N−1) | BWave (M+1,N−1) | BWave (M+2,N−1) |
| BWave (M−2,N) | BWave (M−1,N) | BWave (M,N) | BWave (M+1,N) | BWave (M+2,N) |
| BWave (M−2,N+1) | BWave (M−1,N+1) | BWave (M,N+1) | BWave (M+1,N+1) | BWave (M+2,N+1) |
| BWave (M−2,N+2) | BWave (M−1,N+2) | BWave (M,N+2) | BWave (M+1,N+2) | BWave (M+2,N+2) |

↑ (B−2)-TH COLUMN ↑ (B−1)-TH COLUMN ↑ (B)-TH COLUMN ↑ (B+1)-TH COLUMN ↑ (B+2)-TH COLUMN

IMAGE PROCESSING APPARATUS FOR DATA COMPRESSION, CONTROL METHOD, AND COMPUTER-READABLE MEDIUM

BACKGROUND OF THE INVENTION

1. Field of the Invention

The present invention relates to a technique for executing image data compression processing which compresses image data obtained by inputting a document from, for example, a scanner for respective predetermined blocks, and restoration processing of compressed data for respective blocks into image data and, more particularly, to a technique for correcting a density and color for an even color part in image data restoration processing.

2. Description of the Related Art

Image data input by, for example, a scanner is often input to have a different density and color, even on a part that is printed to have even density and color on a document, which is caused by floating of the document and a light amount of unevenness of a light source that illuminates the document. The unevenness of density and color stand out as image deteriorations when input image data is printed.

Conventionally, when the density unevenness and color unevenness are corrected, input image data is displayed on, for example, a monitor, and is corrected according to instructions of a part to be corrected and correction processing contents designated by an operator (see Japanese Patent Laid-Open No. 2000-278528). That is, various manual settings are required.

When the unevenness correction is to be automatically executed, recognition processing of parts to be corrected and correction amounts has to be executed for all data included in original image data so as to recognize parts to be corrected and how to correct these parts. After that, processing for correcting all data included in the original image data is executed again based on the recognized information.

As described above, when the density unevenness and color unevenness are to be corrected by the conventional method of manually designating a part to be corrected and correction method, a long processing time is required for correction processing as well as many hardware resources (equipments).

In the aforementioned automatic correction method, two processes, that is, the recognition processing and correction processing are required for all data included in an original image. Hence, in case of hardware implementation, a large-scale processing circuit and a considerable processing time are required.

Even in case of software implementation, the processing require a long processing time.

SUMMARY OF THE INVENTION

According to one aspect of the present invention, there is provided an image processing apparatus, which applies correction processing to input image data, comprising: a compression unit configured to compress the image data based on values of pixels and a layout of the pixels for each tile including the predetermined number of pixels; a representative value calculation unit configured to calculate a representative value from the values of the pixels included in the tile; a determination unit configured to determine based on a distribution of the representative values of tiles included in a first area including the first number of tiles whether or not a tile of interest included in the first area is to be corrected; a correction value calculation unit configured to calculate a correction value for the tile of interest based on the representative values of tiles included in a second area including the second number of tiles; and an addition unit configured to add representative values of the tiles, determination results of the tiles by the determination unit, and the correction value to the image data compressed by the compression unit.

According to another aspect of the present invention, there is provided a control method of an image processing apparatus, which applies correction processing to input image data, comprising: a compression step of controlling a compression unit to compress the image data based on values of pixels and a layout of the pixels for each tile including the predetermined number of pixels; a representative value calculation step of controlling a representative value calculation unit to calculate a representative value from the values of the pixels included in the tile; a determination step of controlling a determination unit to determine based on a distribution of the representative values of tiles included in a first area including the first number of tiles whether or not a tile of interest included in the first area is to be corrected; a correction value calculation step of controlling a correction value calculation unit to calculate a correction value for the tile of interest based on the representative values of tiles included in a second area including the second number of tiles; and an addition step of controlling an addition unit to add representative values of the tiles, determination results of the tiles by the determination unit, and the correction value to the image data compressed in the compression step.

According to another aspect of the present invention, there is provided a computer-readable medium storing a program for controlling a computer to function as: a compression unit configured to compress image data based on values of pixels and a layout of the pixels for each tile including the predetermined number of pixels; a representative value calculation unit configured to calculate a representative value from the values of the pixels included in the tile; a determination unit configured to determine based on a distribution of the representative values of tiles included in a first area including the first number of tiles whether or not a tile of interest included in the first area is to be corrected; a correction value calculation unit configured to calculate a correction value for the tile of interest based on the representative values of tiles included in a second area including the second number of tiles; and an addition unit configured to add representative values of the tiles, determination results of the tiles by the determination unit, and the correction value to the image data compressed by the compression unit.

In association with color/density unevenness correction processing, an increase in hardware and a processing time required for the correction processing can be greatly reduced.

Further features of the present invention will become apparent from the following description of exemplary embodiments (with reference to the attached drawings).

BRIEF DESCRIPTION OF THE DRAWINGS

FIG. 3 is a view which enumerates patterns of blocks when image data is divided into blocks;

FIG. 4 is a view which enumerates block patterns and their identifiers;

FIG. 6 is a view showing correspondence between block patterns and pattern flags;

FIG. 11 is a view showing the configurations of a packet and header according to the first embodiment;

FIG. 12 shows an example of a packet management table according to the first embodiment;

FIGS. 20A, 20B, and 20C are views showing a correction target determination method;

FIGS. 23A and 23B are views showing the configuration of a Top header;

FIG. 33 shows features of gradation images according to the third embodiment;

FIGS. 34A and 34B views for explaining gradation image extraction processing according to the third embodiment;

DESCRIPTION OF THE EMBODIMENTS

First Embodiment

Figure 1:
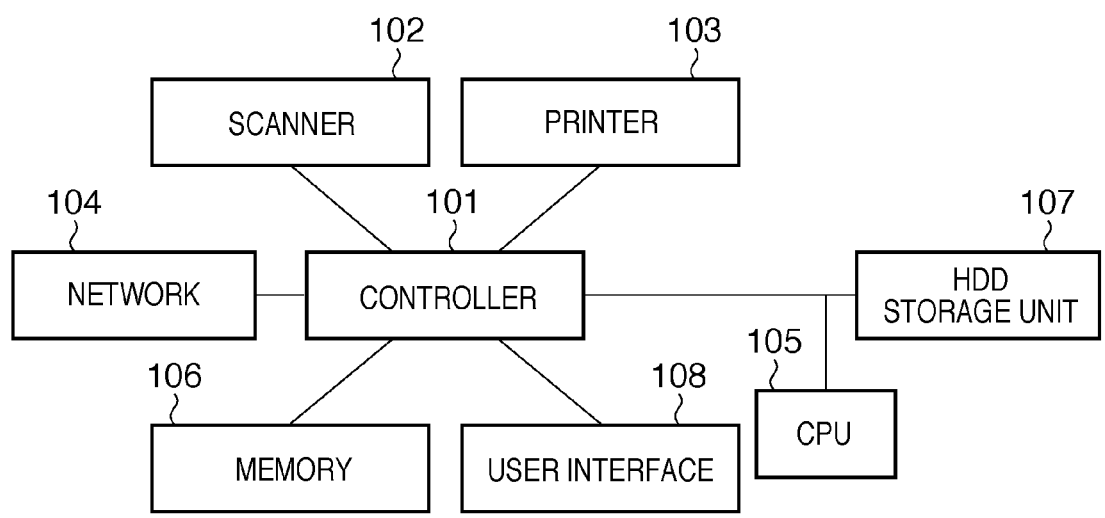
FIG. 1 is a block diagram showing an overview of an MFP system.

An embodiment of compression processing and expansion processing required to practice the present invention will be described hereinafter. FIG. 1 is a block diagram showing the overall arrangement of a digital multi-function peripheral system (to be referred to as MFP hereinafter) which performs scan, print, and copy operations according to an embodiment of the present invention.

[System Arrangement]

A controller 101 is connected to a scanner 102 as an image input device and a printer 103 as an image output device. Also, the controller 101 is connected to a network 104 such as a LAN or public network (WAN) to input/output image information and device information, and to expand PDL data into image data. A CPU 105 is a processor which controls the overall system. A memory 106 is a system work memory required for the operations of the CPU 105, and is also an image memory used to temporarily store image data. An HDD storage unit 107 is a hard disk drive, and stores system software and image data. A user interface 108 includes a display used to display MFP statuses and image data, and buttons, switches, and a numeric keypad, which are used by the user to make various settings upon using the MFP, or a touch panel which serves as both a display and buttons.

[Operation of Controller]

Figure 2:
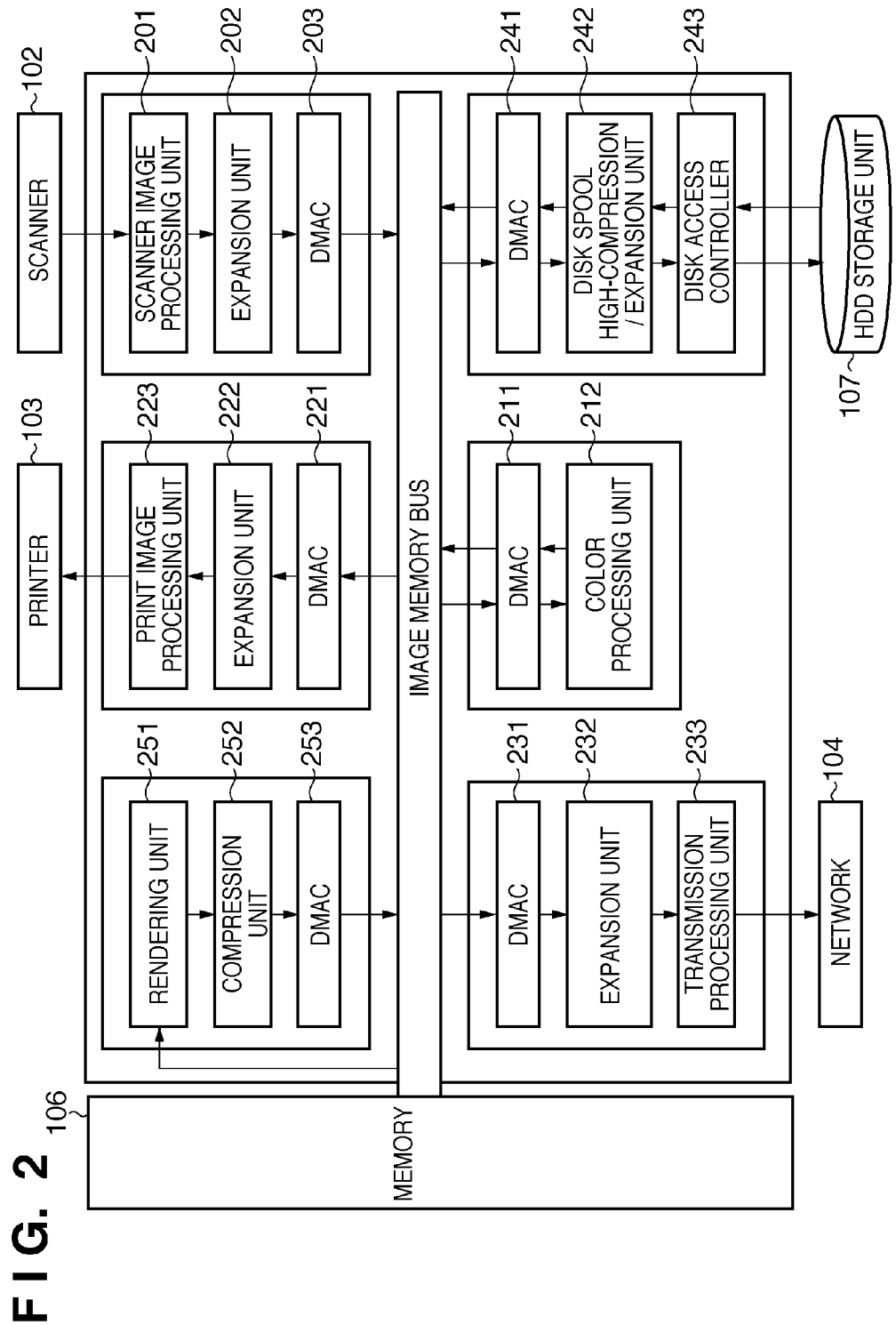
FIG. 2 is a block diagram showing an overview of a controller.

The operation of the controller 101 shown in FIG. 1 will be described in detail below with reference to FIG. 2. A case will be explained wherein scan data is loaded. In the controller 101 which received R, G, and B (RED, GREEN, and BLUE) scanned image data of three colors from the scanner 102, a scanner image processing unit 201 applies image processing such as shading processing and filter processing to these image data. A compression unit 202 applies image compression processing to the data. The compressed data are stored in the memory 106 via a DMAC (DIRECT MEMORY ACCESS CONTROLLER) 203. Upon printing scan data, compressed data stored in the memory 106 are input to a color processing unit 212 via a DMAC 211, and are converted onto a CMYK (CYAN, MAGENTA, YELLOW, and BLACK) color space. After that, these C, M, Y, and K values undergo color processing for adjustment such as density adjustment and printer gamma correction, and the processed values are stored again in the memory 106 via the DMAC 211. In order to apply image processing for printing, compressed data stored in the memory 106 are loaded via a DMAC 221, and are expanded to raster image data by an expansion unit 222. The raster C, M, Y, and K image data are input to a print image processing unit 223, undergo area gradation processing by method of dithering or error diffusion, and are then output to the printer 103. Upon transmitting scan data onto a network, compressed data stored in the memory 106 are input to the color processing unit 212 via the DMAC 211 and undergo color conversion. More specifically, the input data undergo, for example, display gamma adjustment and paper background color adjustment, and are converted onto a YCbCr (luminance, BLUE color difference, and RED color difference) color space. After that, the converted values are stored in the memory 106 via the DMAC 211 again. In order to apply image processing for transmission, compressed data stored in the memory 106 are loaded via a DMAC 231, and are expanded to raster image data by an expansion unit 232. A transmission processing unit 233 applies JPEG compression processing to raster Y, Cb, and Cr image data in case of color image transmission, or binarizes Y data and applies, for example, JBIG compression to the Y data in case of monochrome binary image transmission. The compressed data are finally output onto the network 104.

Upon saving scan data, compressed data stored in the memory 106 are input to a disk spool high-compression/expansion unit 242 via a DMAC 241. The disk spool high-compression/expansion unit 242 applies JPEG compression with a higher compression ratio to the input data since an HDD write speed is lower than that to the memory. After that, the compressed data are saved in the HDD storage unit 107 via a disk access controller 243. When saved data are to be expanded onto the memory again, processing opposite to that described above is executed.

[Write in Memory]

A case will be explained below wherein PDL (Page Description Language) data is written in the memory. Although not shown in FIG. 2, PDL data sent from the network in FIG. 1 is interpreted by the CPU 105 to output a display list to the memory 106. After that, the display list stored in the memory 106 is rendered to raster RGB image data by a rendering unit 251, and these image data then undergo image compression processing by a compression unit 252. The compression unit 252 stores the compressed data in the memory 106 via a DMAC 253. The print processing, transmission processing onto the network, and saving processing of the PDL data can be implemented by executing the same processes as those for the scan data.

[Compression Processing and Pattern Flag]

Details of the compression unit of raster image data will be described below. A block of 2×2 pixels is extracted from raster image data for each page, and data for that block is compressed. Prior to a description of processing, the number of combinations according to the number of colors in four (=2×2) pixel data will be examined. Since the number of pixels is four, the number of colors in these pixel data is a maximum of four, and there are combinations of one to four colors at most in a block. The numbers of combinations that these patterns of four colors can assume will be explained below with reference to FIG. 3.

When a block includes one color, since four pixels are configured by the same color, only one combination is available. A case will be examined below wherein a block includes two colors. As for the number of combinations when two colors are laid out in four pixels, assuming that the color of an upper left pixel is a first color, and that of another pixel is a second color, since the first or second color is set in the remaining three pixels other than the upper left pixel, a total of seven different combinations are available except for a case in which four pixels have the same color.

A case will be examined below wherein a block includes three colors. The number of combinations when three colors are laid out in four pixels can be also the number of combinations when only one of three colors is used twice, and the number of combinations when two pixels of the coordinate positions of four pixels have the same color. That is, the number of combinations for three colors is that of combinations which assume two out of four coordinate positions, and a total of six different combinations are available.

Finally, when a block includes four colors, only one pattern is available as in the case of one color. By summing up the numbers of patterns for one to four colors, a total of 15 different patterns are available. When a flag is assigned to identify all these patterns, 4 bits are required as a data size, as shown in FIG. 4, and this flag will be referred to as a pattern flag hereinafter.

Figure 5:
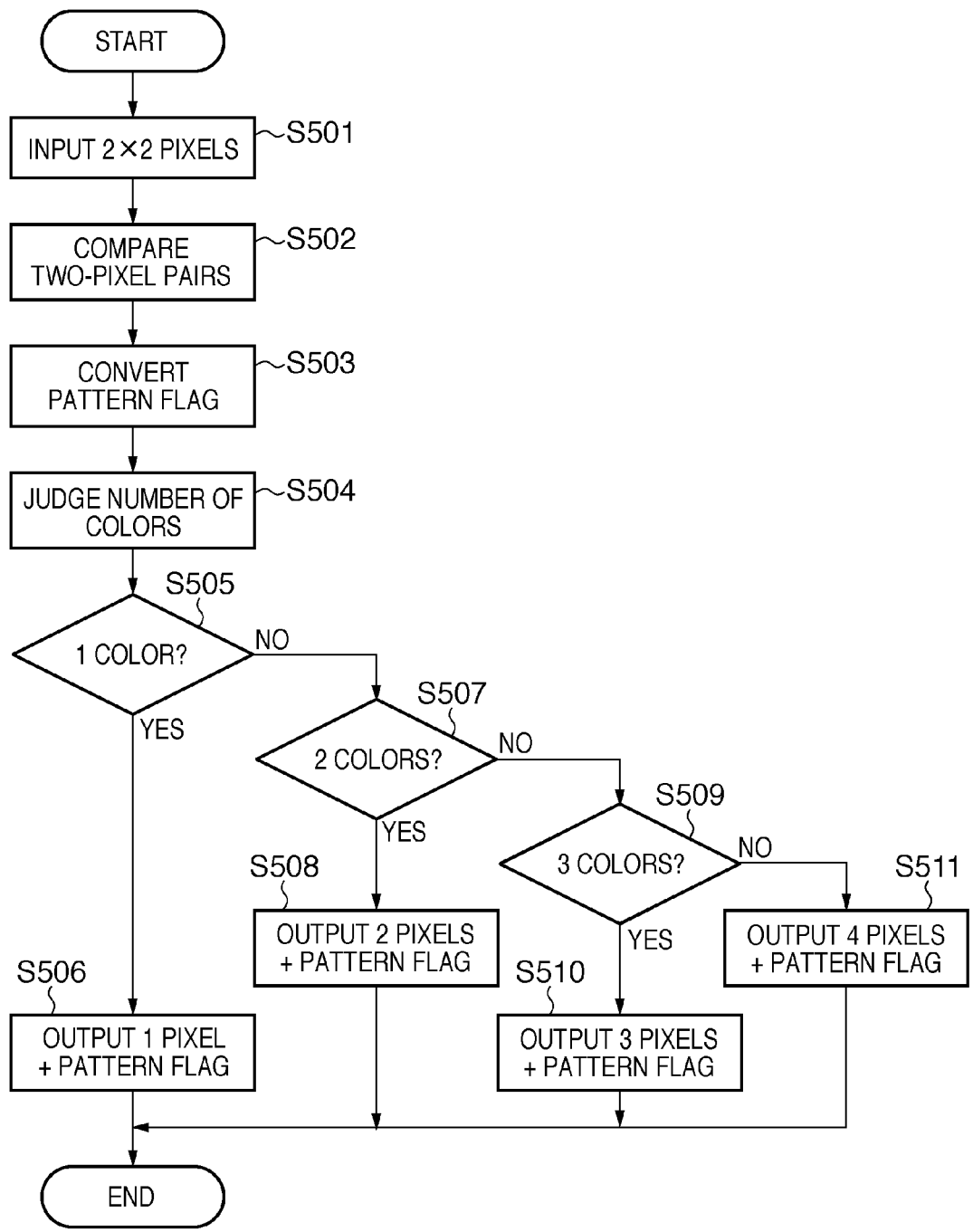
FIG. 5 is a flowchart showing the sequence of basic image compression processing.

The processing sequence to be executed by the compression units 202 and 252 will be described below with reference to FIG. 5 in consideration of the aforementioned combinations that 2×2 pixels can assume. The following description will be given under the assumption that each of R, G, and B data is input as 8 bits to have 256 gradation levels, and data are dot sequential 8-bit data, that is, one pixel is expressed by 24-bit data.

The compression unit inputs a block of 2×2 pixels (S501). The compression unit compares 24 bits for all combinations of two pixels in that block (S502). As a result of comparison, "1" is output when all bits match, and "0" is output when they do not match.

As shown in FIG. 6, when coordinates 1, 2, 3, and 4 are assigned in the order of an upper left pixel, upper right pixel, lower left pixel, and lower right pixel in 2×2 pixels, since there are a total of six different pairs of two pixels, that is, pairs 1-2, 1-3, 1-4, 2-3, 2-4, and 3-4, the comparison processing has to be executed six times, and a 6-bit result is output. For example, when all pixels have the same color, all comparison results output "1". Conversely, when all four pixels have different pixel values, all comparison results output "0". As described above, since the number of patterns that can appear based on color matches in four pixels is 15, the 6-bit comparison result can be converted into a 4-bit pattern flag (S503). After the comparison result is converted into the 4-bit pattern flag, the compression unit extracts the number of colors and color data which appear in the four pixels (S504). The positions of the second and subsequent colors when the color of the upper left pixel is defined as the first color can be obtained based on the pattern flag.

Figure 7:
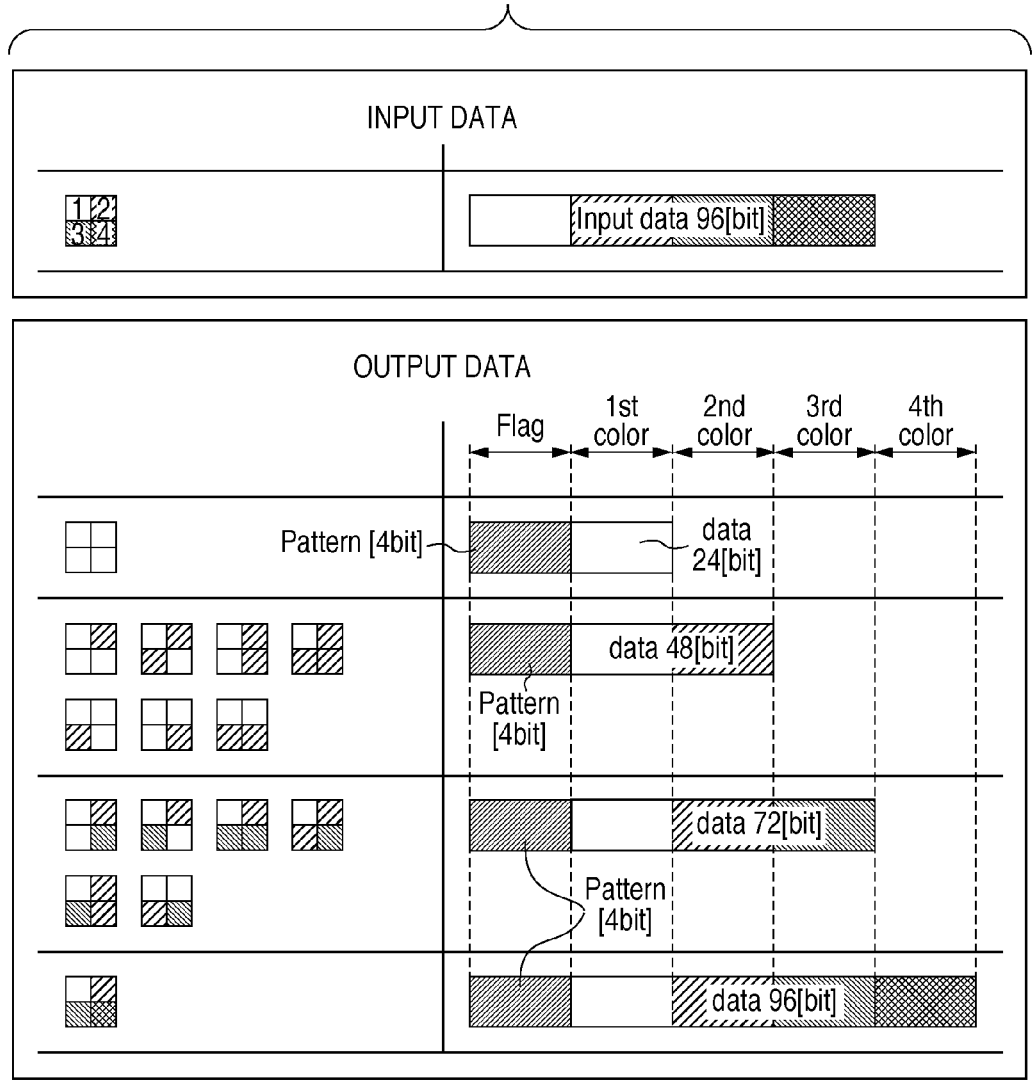
FIG. 7 is a view showing the relationship between input and output data in compression processing.

The configuration of output data with respect to input data will be described below with reference to FIG. 7. For example, if it is settled that four pixels include one color, since there is no second or subsequent color, the compression unit outputs 4 bits as a pattern flag and 24 bits as the first color data (S506). If it is settled that four pixels include two colors (S507), the compression unit calculates the coordinate position of the second color based on a pattern flag, and outputs 4 bits as the pattern flag and 48 bits as pixel values for the two colors (S508). The compression unit executes the same processing for three and four colors (S509, S510, and S511). At this time, the compression unit stores color data which did not appear so far in the order of coordinates (1, 2, 3, and 4 in turn from the upper left pixel, upper right pixel, lower left pixel, and lower right pixel) in the block. Then, the compression unit ends the processing.

In this way, an output data size of 96-bit input data of four colors in a block of 2×2 pixels can be reduced by relatively simple processing by outputting a 4-bit pattern flag and pixel values as many as the number of colors included in the block. By referring to the pattern flag, the number of colors and a layout pattern of the colors in that block can be specified. When this processing is applied to all image blocks, data compression of the entire image surface can be attained.

Note that the number of pixels which form a block is not limited to 2×2 pixels, and may be increased as needed. In this case, a value required as a pattern flag is also changed.

[Data Write Structure]

Figure 8:
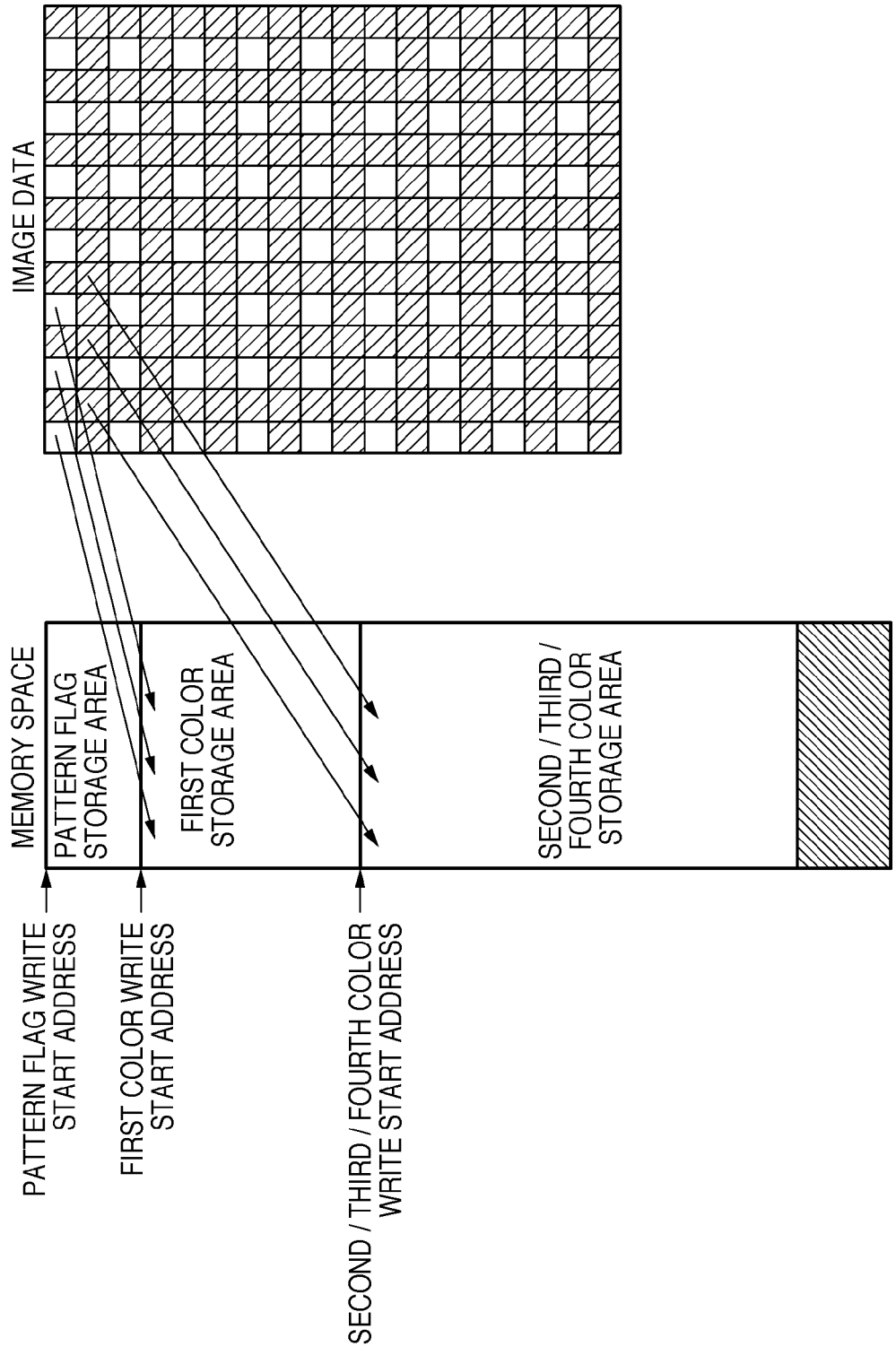
FIG. 8 is a view showing the configuration of compressed data stored on a memory space.

The pattern flag and color data obtained in this way are written in the memory via the DMAC. At this time, the DMAC changes write positions of the pattern flag, data of the first color, and those of the second, third, and fourth colors. To the DMAC, three addresses, that is, a memory start address required to write the pattern flag, that required to write first color data, and that required to write second, third, and fourth color data are designated. FIG. 8 shows that example.

For example, when R, G, and B 8-bit images each having a size of M×N pixels are input to the compression unit, the data size of pattern flags is M×N/8 bytes. The data size of the first color is M×N×¾ bytes, and the data sizes of the second, third, and fourth colors are indefinite outputs depending on an image (they are different depending on an image). In this case, a memory area after the first color write position stores pixel data without being quantized or encoded for each pixel. That is, color processing which is completed by inputting one pixel and outputting one pixel (for example, color conversion using an LUT, gamma correction processing, and color space conversion processing using matrix calculations) can be directly executed without particularly referring to the pattern flag. The color processing unit shown in FIG. 2 loads pixel data after the first color write start address on the memory via the DMAC, and writes them back onto the memory after processing for each pixel. At this time, each pixel data is overwritten at the same position on the memory unless the number of bits of the pixel is changed by arbitrary processing for each pixel, thus also saving the memory.

Since compressed data is directly used in this way, the transfer efficiency on a memory bus can be improved. Also, since processing is applied to data of the smaller number of pixels than an original image, high-speed processing can be attained. As shown in FIG. 8, since image data is discretely stored on the memory, as for a first color storage area, image results obtained by sampling pixels at the upper left coordinates of the image in 2×2 pixel blocks are continuously stored on the memory. The MFP described in this embodiment has, for example, a preview display function of stored PDL image data and scanned image data, and the aforementioned network transmission function. For example, even when a print resolution is 600 dpi, such high resolution is normally not required in the preview or transmission mode, and a resolution of 300 dpi or lower often suffices. When such reduced-scale data is required to be obtained, a pattern flag and second, third, and fourth color data are discarded, and only image data of the first color is handled, thus easily obtaining a raster image having a half size.

In the above example, a reduced-scale transmission operation when image data is stored at 600 dpi will be described below. When a resolution such as 400 dpi higher than 300 dpi of sampled data is designated, compressed data including the pattern flags is temporarily expanded, and is then transmitted using known scaling processing. When a transmission resolution lower than 300 dpi is designated, only data in the first color storage area is used, and scaling processing to the designated resolution is executed. In this way, data can be selectively loaded in correspondence with a required image size.

The expansion units 222 and 232 paired with the compression units will be described below. The expansion unit executes processing for restoring compressed data to original raster image data based on the pattern flags and pixel data, as described above.

The three addresses, that is, the pattern flag write start address, first color write start address, and second/third/fourth color write start address of compressed data laid out on the memory, as shown in FIG. 8, are designated to the DMAC.

The DMAC reads out data from these three addresses, and inputs the data to the expansion unit. The expansion unit interprets a 4-bit pattern flag to calculate the number of colors in a block of interest. The expansion unit reads out second, third, and fourth color data in accordance with the number of colors in addition to first color data, and lays out pixel data again according to the pattern of the pattern flag. In this manner, the expansion unit expands and decodes a 2×2 pixel block.

When the expansion unit reduces an image size to ½, since the pattern flags and second, third, and fourth color data are not required, as described above, the expansion unit designates only the first color write start address to the DMAC to read out only first color data from the memory, thus forming an image. In this manner, memory bus bands can be saved.

With the aforementioned arrangement, not only the memory size and memory bus bands can be saved by the relatively simple compression method, but also a processing load on image processing for each pixel and reduction-scaling processing can be reduced.

Note that this embodiment describes a block of 2×2 pixels as a minimum unit. However, the present invention is not limited to this. When a pixel size of a block is changed, the number of bits required for a pattern flag is also changed. Also, R, G, and B 8-bit data have been exemplified as image data in the description of compression. Alternatively, image data which adopts a CMYK color space, grayscale data, or image data which assumes pixel values other than 8 bits may be used.

[Raster Image Data Compression]

An embodiment which enhances random accessibility in the aforementioned raster image data compression unit will be explained below. The aforementioned compression method corresponds to variable length compression processing with which a compressed data size varies depending on image data. For this reason, the compression method has no random accessibility for compressed data, and is not suited to, for example, a method of clipping and processing only a part of an image. Hence, a compression method which focuses on enhancement of the random accessibility of the aforementioned method will be described.

Figure 9:
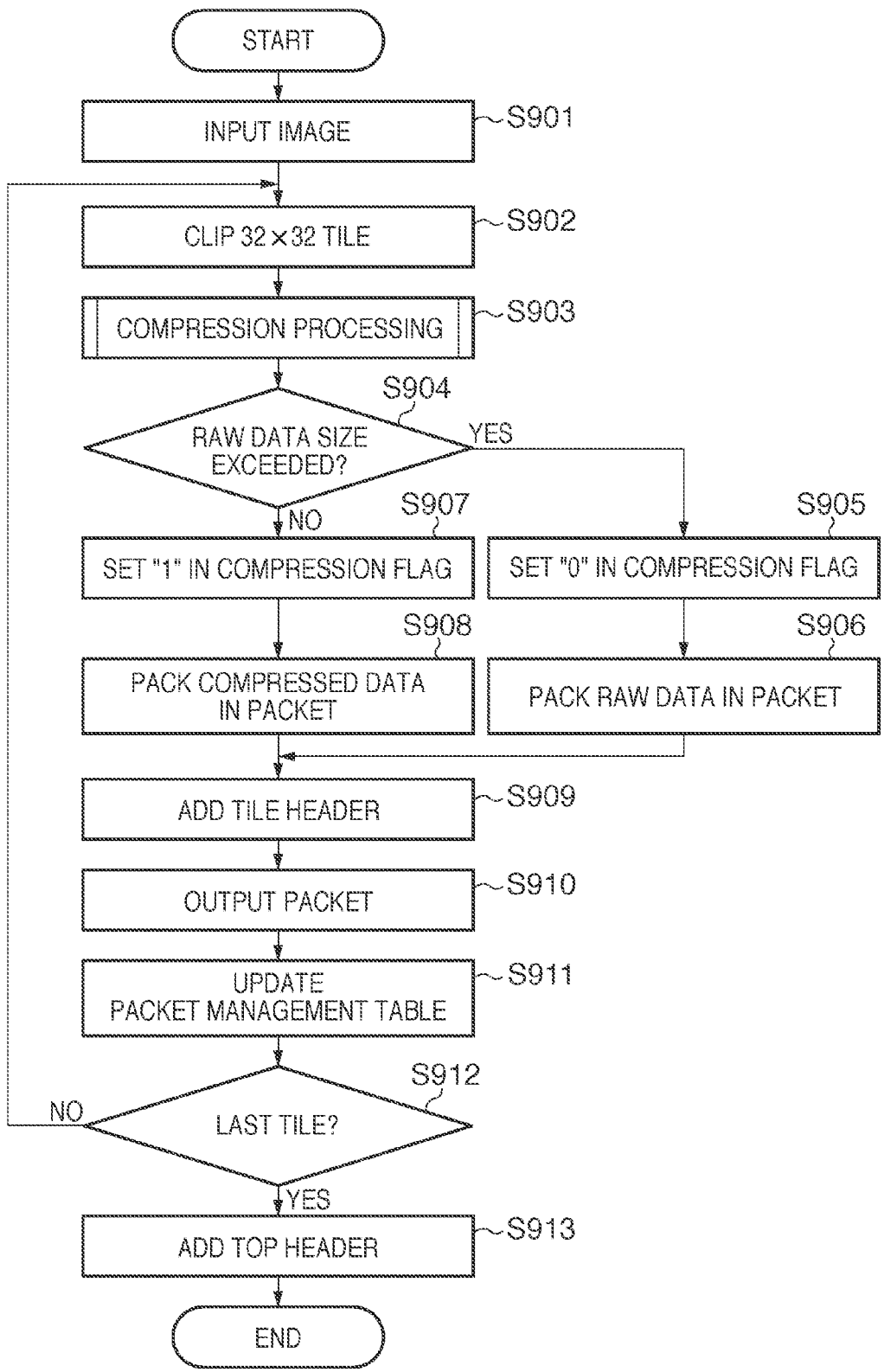
FIG. 9 is a flowchart showing the sequence of image compression processing.
Figure 10:
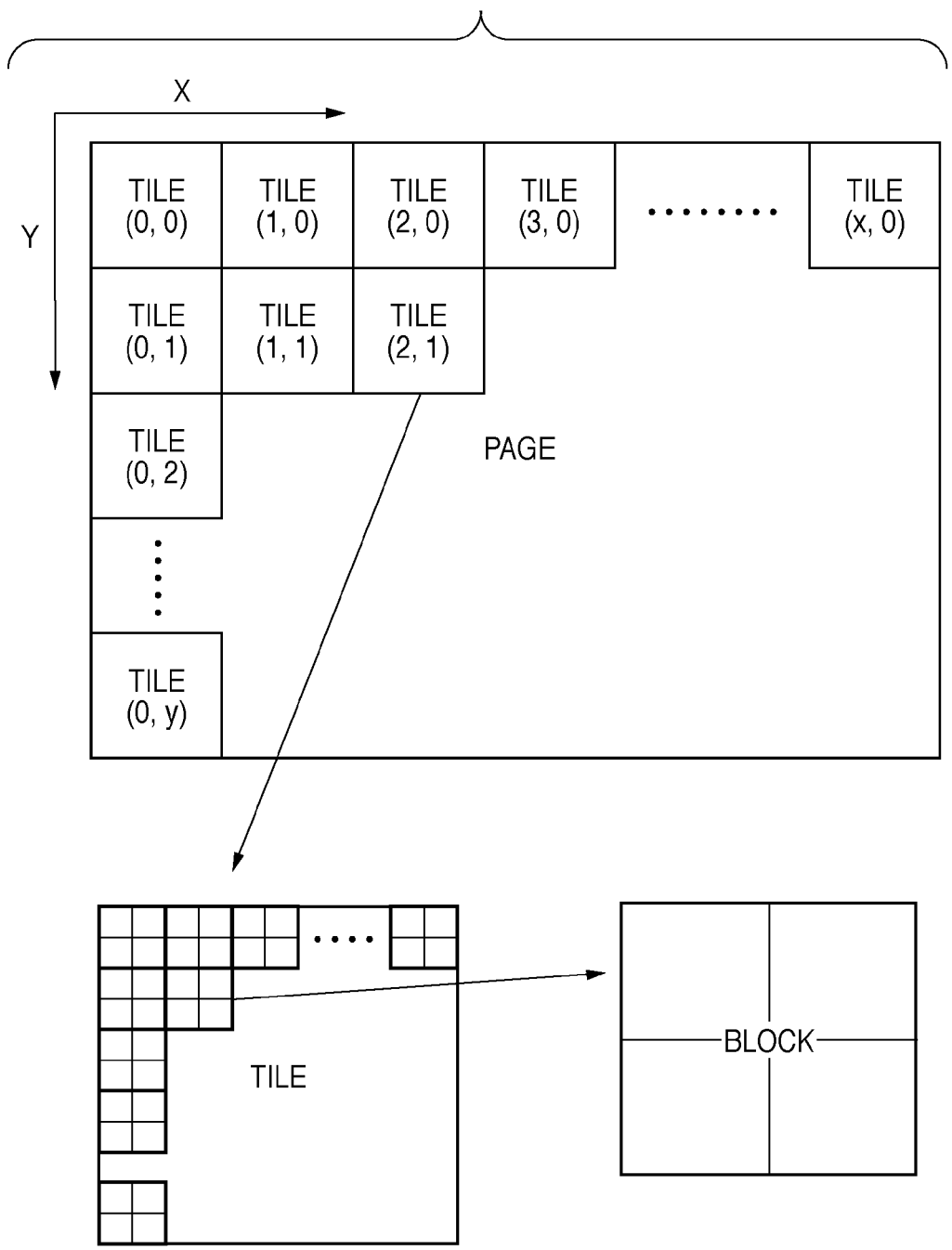
FIG. 10 is a view showing the relationship among a page, tiles, and blocks according to the first embodiment.

Details will be described below with reference to FIG. 9. Raster image data for each page is input (S901). The compression unit divides the input image data into elements each having a predetermined size (S902). In this embodiment, the predetermined size is defined by 32×32 pixels. In the following description, this element will be referred to as a tile to be distinguished from a block of 2×2 pixels described so far. FIG. 10 shows the relationship between tiles and blocks. The compression unit applies the compression processing by the aforementioned method for each tile (S903). A description of the compression processing will not be repeated. Note that this embodiment handles a tile configured by 32×32 pixels. However, the present invention is not limited to such specific size, and the tile size may be increased/decreased as needed. Note that the tile size is desirably configured in consideration of a block size in such case.

The compression unit then calculates a data size of the compressed tile data. The data size corresponds to a total of the pattern flag size, first data size, and second/third/fourth data size. Since pattern flags of 32×32 bits are always assigned for each tile, it is not always guaranteed that the data size is compressed to be smaller than original image data. For this reason, when the size of compressed data that has undergone the compression processing exceeds that of original image data, raw image data (that is, original image data: to be referred to as raw data hereinafter) is preferably output to improve efficiency in terms of a total size upon holding an image. For this reason, the compression unit compares sizes of the compressed data and raw data (S904).

If the size of the compressed data exceeds that of the raw data (YES in step S904), the compression unit sets "0" in a compression flag in a header (S905). If the size of the compressed data does not exceed that of the raw data (NO in step S904), the compression flag sets "1" in the flag (S907). The compression unit packs one of the compressed data and raw data having a smaller data size into one data based on the comparison result (S906 or S908). FIG. 11 shows this data structure. A data unit including this header will be referred to as a "packet" hereinafter.

The compression unit assigns header information having a predetermined fixed length to each packet data (S909). In this embodiment, the header information describes a page ID, tile coordinates, a color space, the number of bits of pixel data, a data size of a tile, the presence/absence of attribute information, and the compression flag. To a page ID, an ID number unique to each page is assigned.

The tile coordinates describe the position of that tile on a raster image for each page. Assume that two-dimensional coordinates, that is, X- and Y-coordinates are described as the tile coordinates. The color space describes an identifier indicating that the tile corresponds to one of an RGB image, CMYK image, and GRAY-SCALE image. The number of bits of pixel data describes a bit length per pixel in the tile. The data size describes the first color data size and second/third/fourth color data size of that tile using a Byte unit. The presence/absence of attribute information describes whether or not attribute information such as text or photo is assigned to each pixel in that image data. The compression flag describes a flag indicating whether the tile stores compressed or non-compressed data. Note that the pieces of information included in the header information are not limited to those described above, and information may be added as needed.

In order to form the packet shown in FIG. 11, after compression processing is complete for each tile, and the data size is settled, the compression unit packs data in the first color storage area and second/third/fourth color storage area without any gap. After packing, the compression unit outputs the packet onto the memory via the DMAC (S910). Then, the compression unit creates a packet management table which enumerates the coordinates and sizes of packets as a list (S911). FIG. 12 shows an example of the packet management table. The compression unit repeats the aforementioned processes up to the last tile (S912).

When an image is written out onto the memory for respective tiles, respective packets have different sizes, as shown in FIG. 12, and have irregular start addresses. For this reason, using the packet management table written out in the aforementioned sequence, the start addresses of packets having arbitrary coordinates are searched for. When the write address of a start packet is given, the start address of an arbitrary packet can be calculated using data sizes up to coordinates described in the packet management table as an offset.

Figure 13:
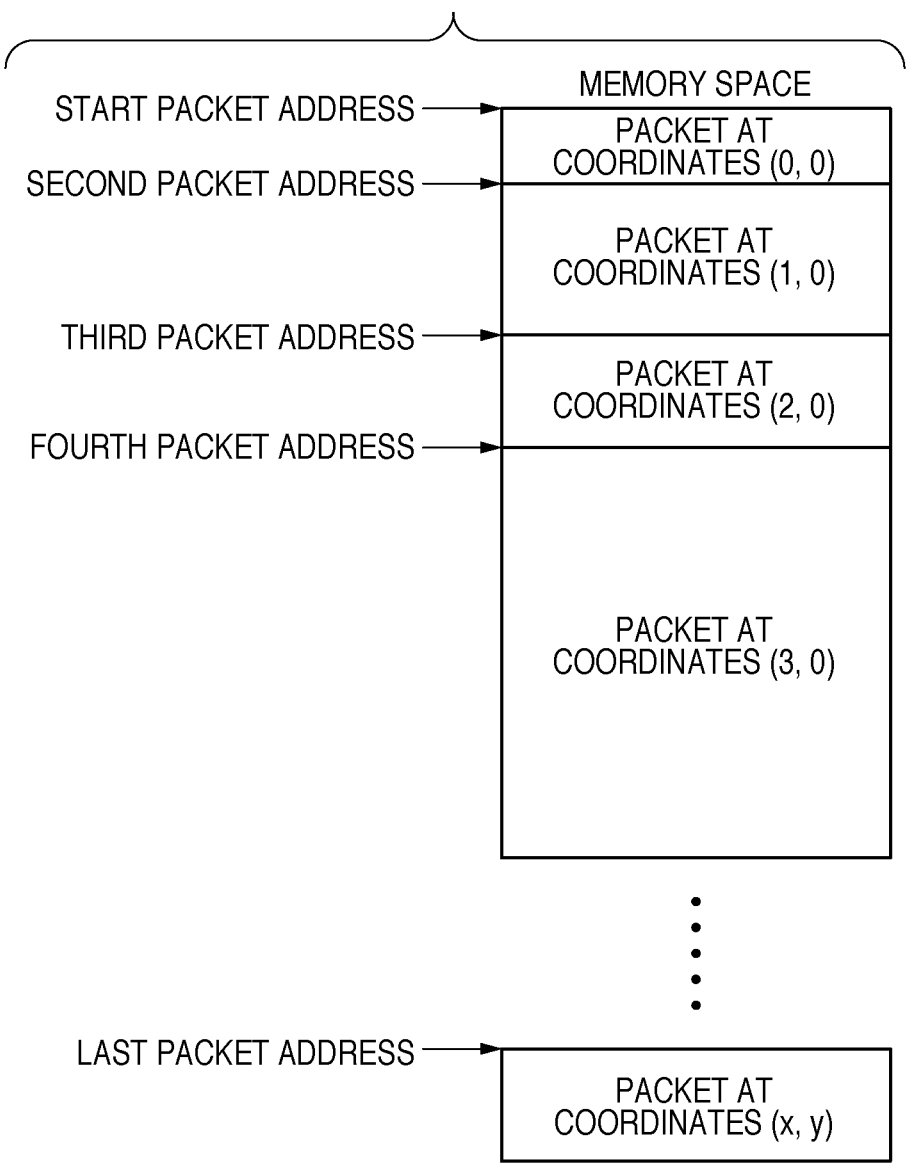
FIG. 13 is a view showing a layout of compressed data on a memory space according to the first embodiment.

For example, a case will be examined below wherein a third packet in FIG. 13 is to be loaded. In this case, a size total of first and second packets is calculated as an offset from the packet management table, and the offset is added to the address of the first packet to calculate a third packet address. By loading data from that address, the third packet data can be acquired. In this way, since arbitrary data can be accessed for respective tiles, partial processing for compressed image data is allowed.

Figure 14:
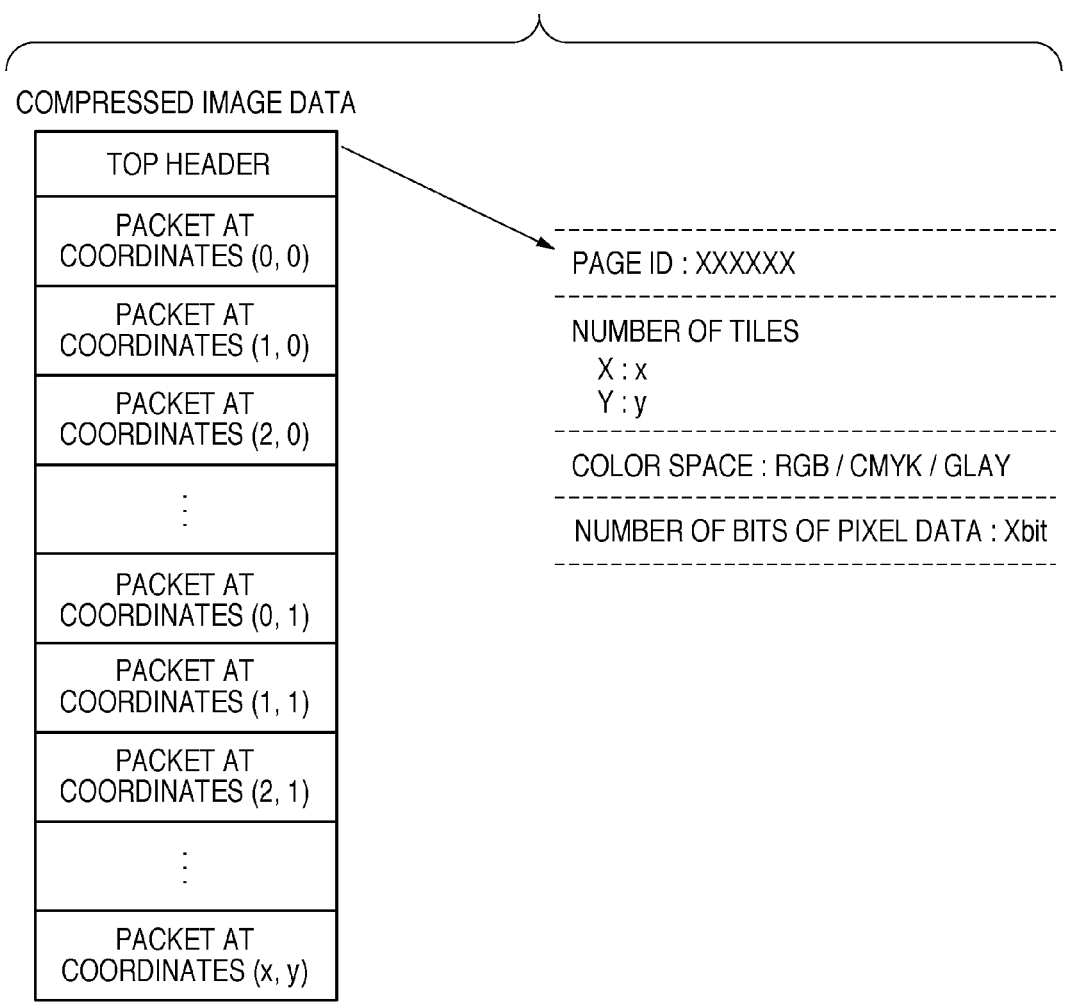
FIG. 14 is a view showing the configuration of a Top header according to the first embodiment.

Upon completion of the processing of all packets for image data, header information for each page is added as a Top header (S913). The contents of the Top header to be added include information common to each page, that is, information such as a page ID, the number of tiles, a color space, and the number of bits of image data, as shown in FIG. 14. When compressed image data is to be saved in a memory or magnetic disk, a storage space of the Top header added at the end of the processing is assured in advance before respective packets. The respective packet data are stored, and the Top header which is output lastly is stored in the assured space. Note that the configuration of the Top header is not limited to that described above, and information may be added as needed. The sequence at the time of compression has been described.

[Hardware Arrangement (for Compression Processing)]

Figure 15:
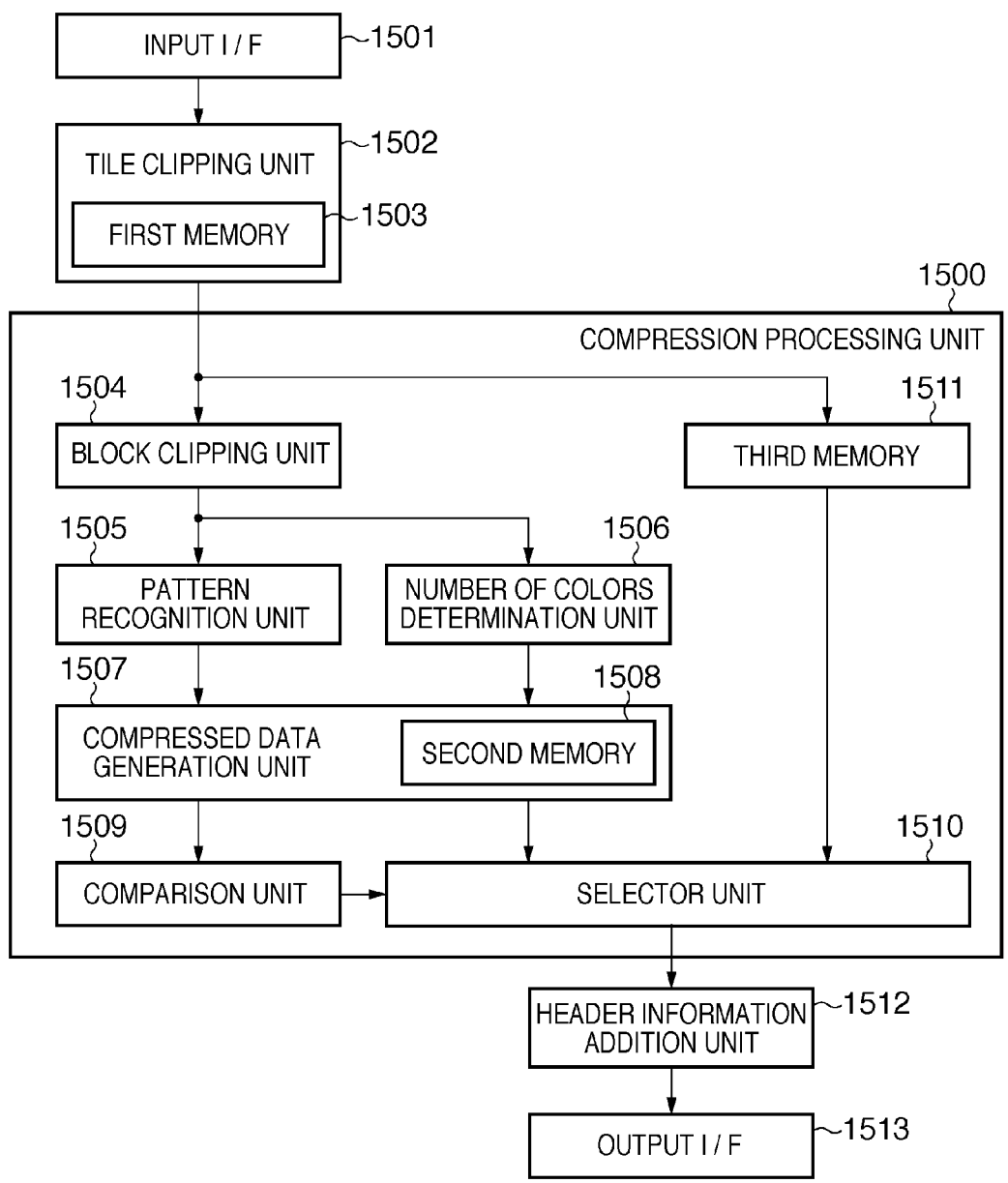
FIG. 15 is a block diagram showing the hardware arrangement for compression processing according to the first embodiment.

FIG. 15 shows an example of the hardware arrangement required to implement the aforementioned compression processing. An input I/F 1501 inputs raster image data. A tile clipping unit 1502 temporarily stores the input raster image data in a first memory 1503, and clips tile data of 32×32 pixels from the stored data. A compression processing unit 1500 applies compression processing to tile image data clipped by the tile clipping unit 1502. A block clipping unit 1504 clips a block (2×2 pixels in this embodiment) from each tile data for the purpose of pattern recognition. A pattern recognition unit 1505 recognizes a pattern in each block. A number of colors determination unit 1506 extracts color information in the block.

A compressed data generation unit 1507 stores pattern information and color information of each block in the tile in a second memory 1508, and packs these pieces of information as compressed data for one tile upon completion of the processing of all blocks in the tile. A comparison unit 1509 compares a data size after compression generated by the compressed data generation unit 1507 with that of raw data which is not compressed. The comparison unit 1509 outputs the comparison result to a selector unit 1510. The selector unit 1510 receives raw data of the tile stored in a third memory 1511 and the compressed data output from the compressed data generation unit 1507. Furthermore, when the data size of the compressed data exceeds that of the raw data, the selector unit 1510 outputs the raw data; when the data size of the compressed data is smaller than that of the raw data, it outputs the compressed data. A header information addition unit 1512 adds header information shown in FIG. 11 to the data output from the selector unit 1510. The data added with the header information by the header information addition unit 1512 is output from an output I/F 1513.

Note that FIG. 15 describes the first and second memories to clarify their roles. However, a single memory may be used in actual implementation.

[Compressed Data Expansion Processing]

Figure 16:
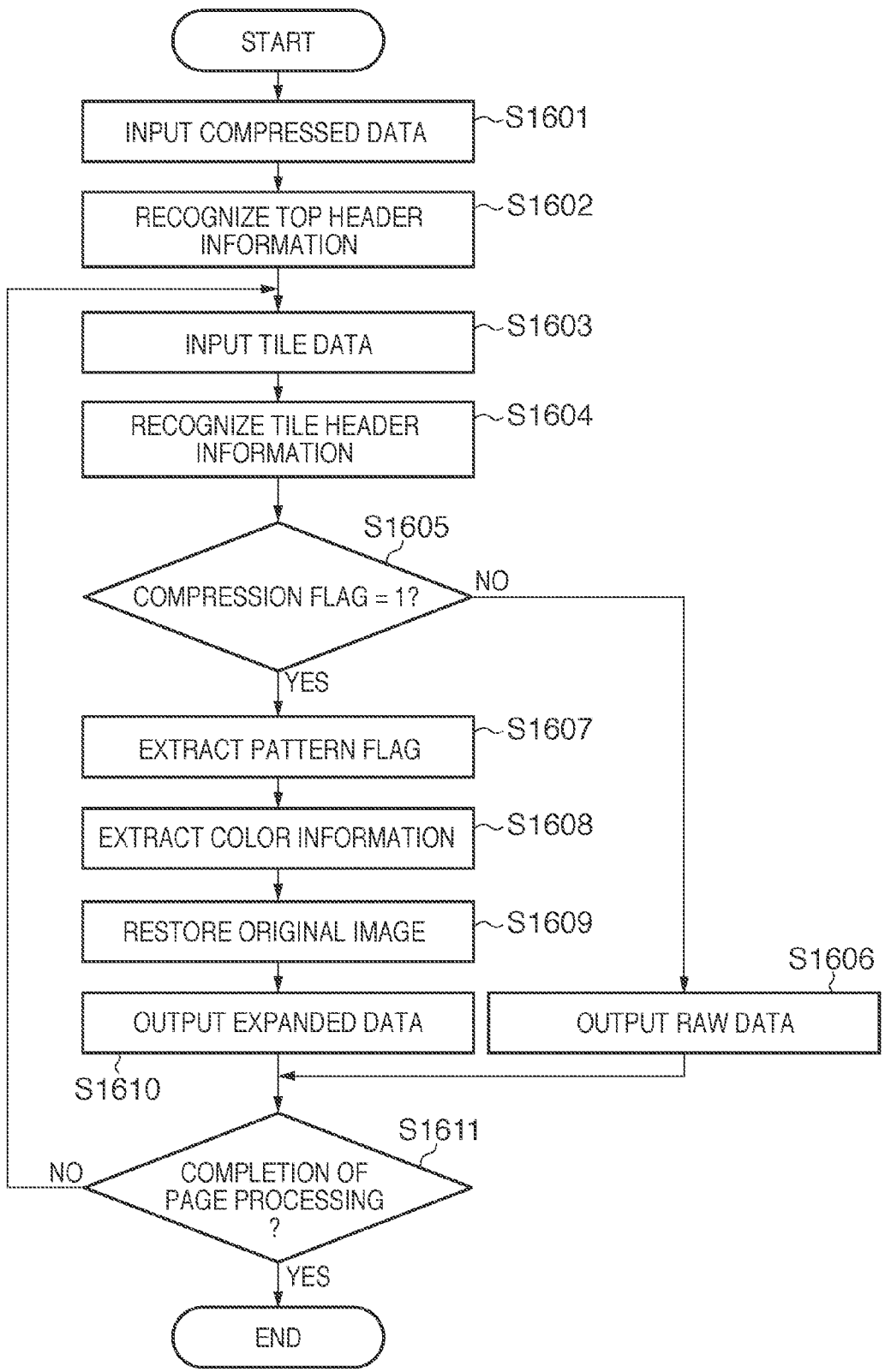
FIG. 16 is a flowchart showing the sequence of image expansion processing according to the first embodiment.

A detailed example upon expanding the compressed data will be described below. FIG. 16 shows an example of the sequence upon execution of the expansion processing. When the processing starts, the expansion unit inputs compressed data (S1601). The expansion unit refers to Top header information (S1602). After that, the expansion unit sequentially inputs packet data of a tile to be processed (S1603). After the tile data is input, the expansion unit recognizes header information for each tile (S1604). Next, the expansion unit refers to the compression flag in the header information. If the compression flag is "1" (YES in step S1605), the expansion unit recognizes that the tile stores compressed data, and the control advances to the subsequent expansion processing. On the other hand, if the compression flag is "0" (NO in step S1605), the expansion unit recognizes that the tile stores non-compressed raw data, and outputs the raw data intact without any expansion processing (S1606).

In the expansion processing, the pattern flag storage position, first color data storage position, and second/third/fourth color data storage position are calculated from the header. For example, the pattern flag storage position can be calculated by adding an offset of the length of the header since the header has a fixed length. Subsequently, the first color data storage position can be calculated by adding an offset to the pattern flag storage position since the pattern flag size is fixed, that is, 32×32 bits when the tile size is defined by 32×32 pixels. Finally, the second/third/fourth color data storage position can be calculated by adding an offset to the first color data storage position with reference to the first color data size described in the header, since the first color data size is indefinite. If YES is determined in step S1605, the expansion unit extracts pattern flags (S1607). After that, the expansion unit extracts color information (S1608). Then, the expansion unit restores an original image (S1609). The expansion unit outputs the restored image data as expanded data (S1610). Upon completion of the aforementioned processes for all tiles of image data (YES in step S1611), the expansion processing ends.

[Hardware Arrangement (for Expansion Processing)]

Figure 17:
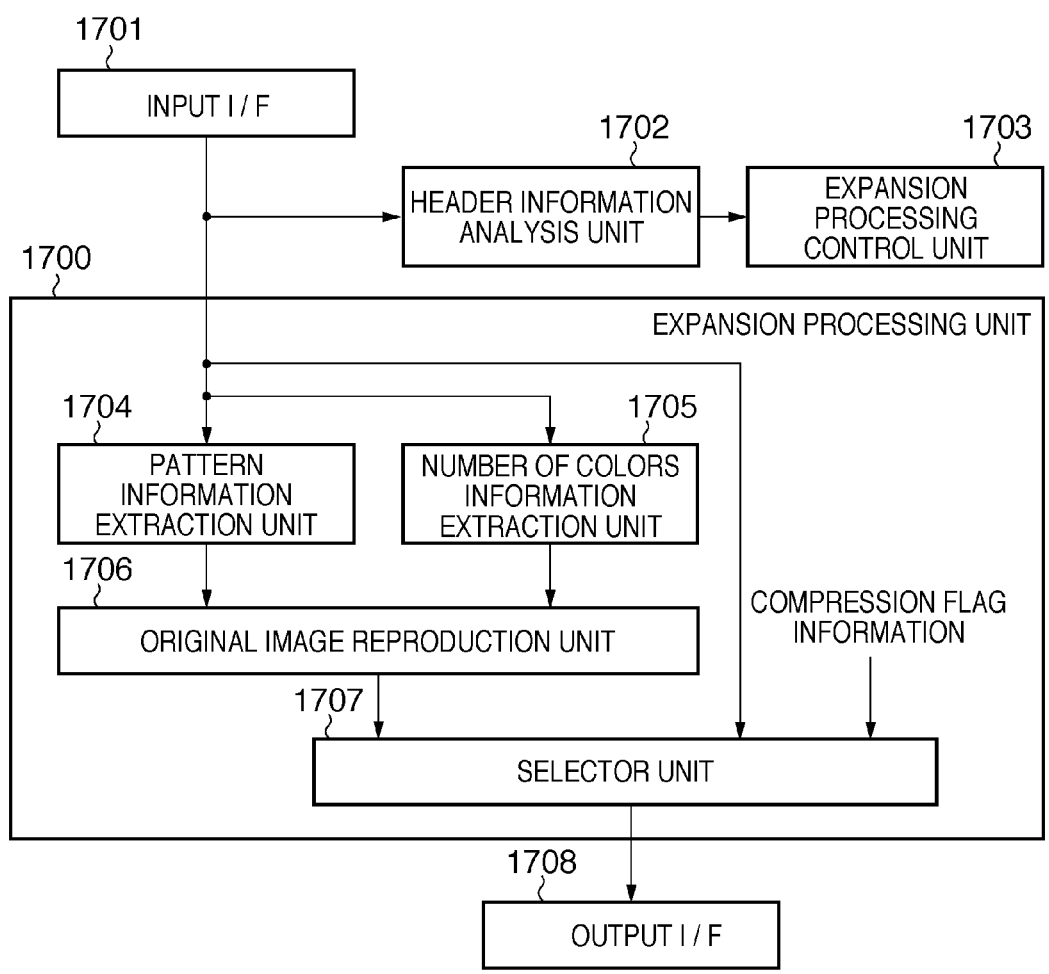
FIG. 17 is a block diagram showing the hardware arrangement for the expansion processing according to the first embodiment.

FIG. 17 shows an example of the hardware arrangement required to implement the aforementioned expansion processing. An input I/F 1701 inputs compressed data. A header information analysis unit 1702 inputs header information of the input compressed data, and analyzes the contents. An expansion processing control unit 1703 controls an expansion processing unit 1700, which executes expansion processing, based on the header information recognized by the header information analysis unit 1702. A pattern information extraction unit 1704 extracts pattern data of 2×2 pixels from the input tile data. A number of colors information extraction unit 1705 extracts color information of the pattern data of 2×2 pixels from the input tile data. An original image reproduction unit 1706 restores an original state of 2×2 pixels based on the pattern information recognized by the pattern information extraction unit 1704 and the color information recognized by the number of colors information extraction unit 1705. When the input packet data is non-compressed raw data based on compression flag information recognized by the header information analysis unit 1702, a selector unit 1707 outputs raw data by excluding the header part from the input packet data. By contrast, when the input packet data is compressed data, the selector unit 1707 outputs image data restored by the original image reproduction unit 1706. The restored data that has undergone the aforementioned processes is output from an output I/F 1708.

[Density/Color Unevenness Correction Processing]

Figure 18A:
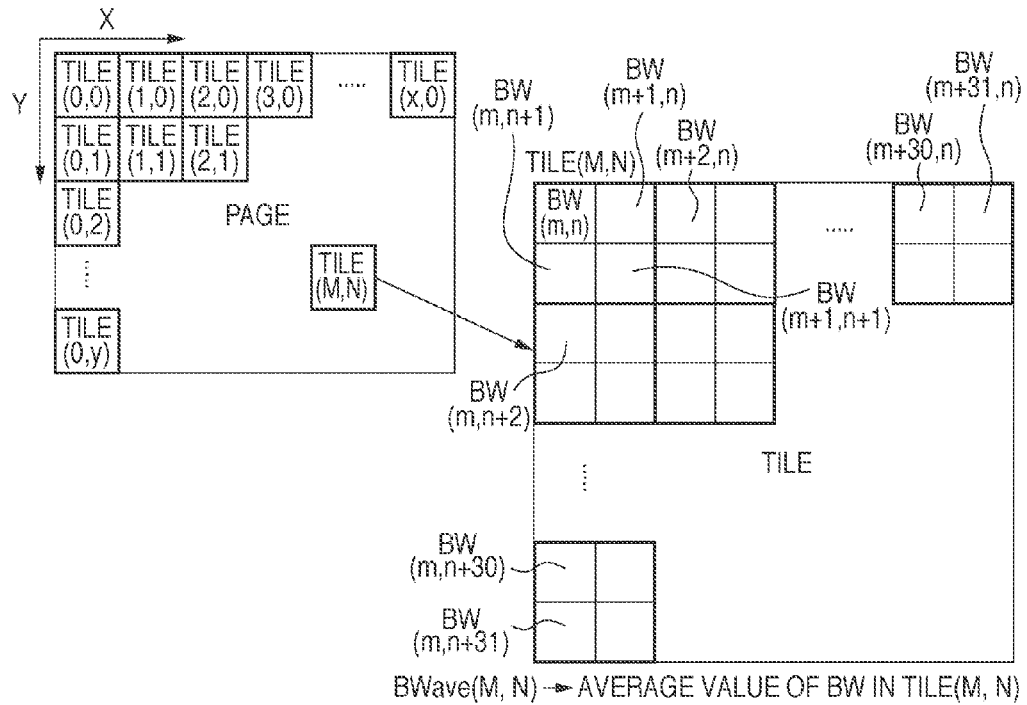
FIGS. 18A and 18B are views showing the relationship among a page, tiles, and blocks.

Processing for adding density/color unevenness correction processing to the aforementioned compression processing and expansion processing will be described below. This embedment will explain an example using grayscale data. Pre-correction processing executed in combination with the compression processing will be described in detail first. As shown in FIG. 18A, tile data of 32×32 pixels is clipped from image data in a page, as in the same manner described above. A tile at coordinates (M, N) includes data from coordinates (0, 0) to coordinates (31, 31) in the tile. In this embodiment, each individual pixel includes 8-bit data as grayscale data BW. Initially, a tile representative value BWave is calculated. In this embodiment, an average value of all pixel data in the tile is calculated as the tile representative value BWave. Next, using the tile representative value, whether or not the tile is a correction processing target is determined. This method will be described below with reference to FIG. 19A.

Assume that a tile at coordinates (M, N) is selected as a tile of interest. An area including a plurality of tiles, that is, A tiles in the main scan direction and B tiles in the sub-scan direction to have the tile of interest as the center is also selected. This embodiment will exemplify a case in which A=5 and B=5. In this case, the area of the tile of interest (M, N) includes tiles within a region from coordinates (M−2, N−2) to coordinates (M+2, N+2) to have the tile of interest as the center. A histogram of tile representative values of tiles included in the area is calculated. When all tile representative values within the area fall within the range of a pre-set value SL (in other words, when the difference between maximum and minimum values of the tile representative values in the area is equal to or smaller than SL), the A×B area is determined as an "even part". Also, the tile of interest is determined as a tile "to which correction processing is applied". When the tile representative values in the area do not fall within the specific range, the A×B area is determined to be "not an even part", and the tile of interest is determined as a tile "to which correction processing is not applied". A value having a highest frequency of all the representative values in the area is selected as an area representative value AREAD.

Figure 19A:
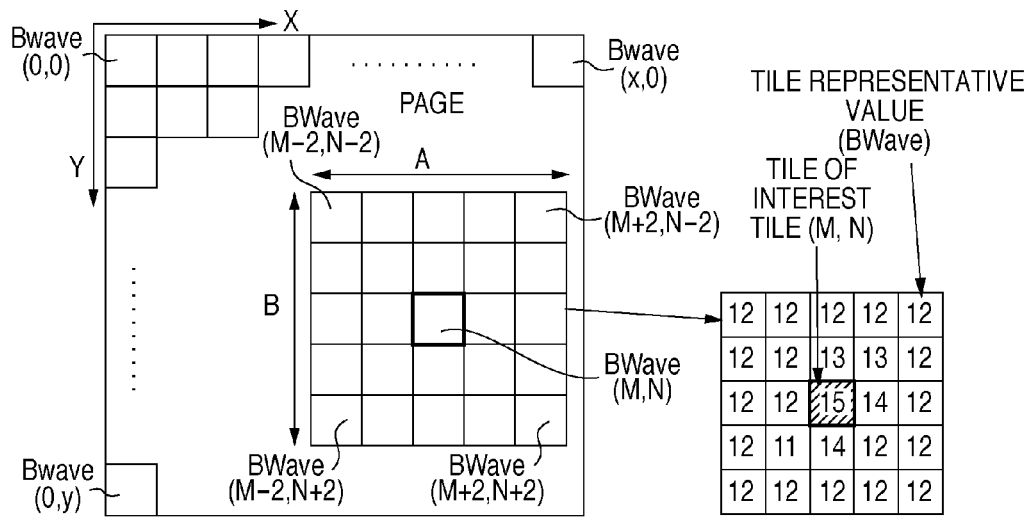
FIGS. 19A, 19B, and 19C are views showing the relationship among a page, tiles, and area.

A practical example will be described below with reference to FIGS. 19A and 20A. Assume that tile representative values BWave within an area of 5×5 tiles having a tile at coordinates (M, N) as a tile of interest have values ranging from "12" to "15", as shown in FIG. 19A. A histogram of the tile representative value within this area is calculated, as shown in FIG. 20A. Using this histogram, the distribution of the tile representative values within the area is confirmed so as to determine a correction target. In this embodiment, all the tile representative values within the area are included in a range of the pre-set value (SL=5), as shown in FIG. 20A. That is, the difference between maximum and minimum values of the tile representative values within the area is equal to or smaller than 5. Hence, the A×B area is determined as an "even part", and the tile of interest is determined as a tile "to which correction processing is applied". Also, a tile representative value "12" having a highest frequency (that is, a mode value) in the area of the tile representative values within the area is selected as an area representative value AREAD(M, N) when the tile at the coordinates (M, N) is selected as the tile of interest.

Figure 21:
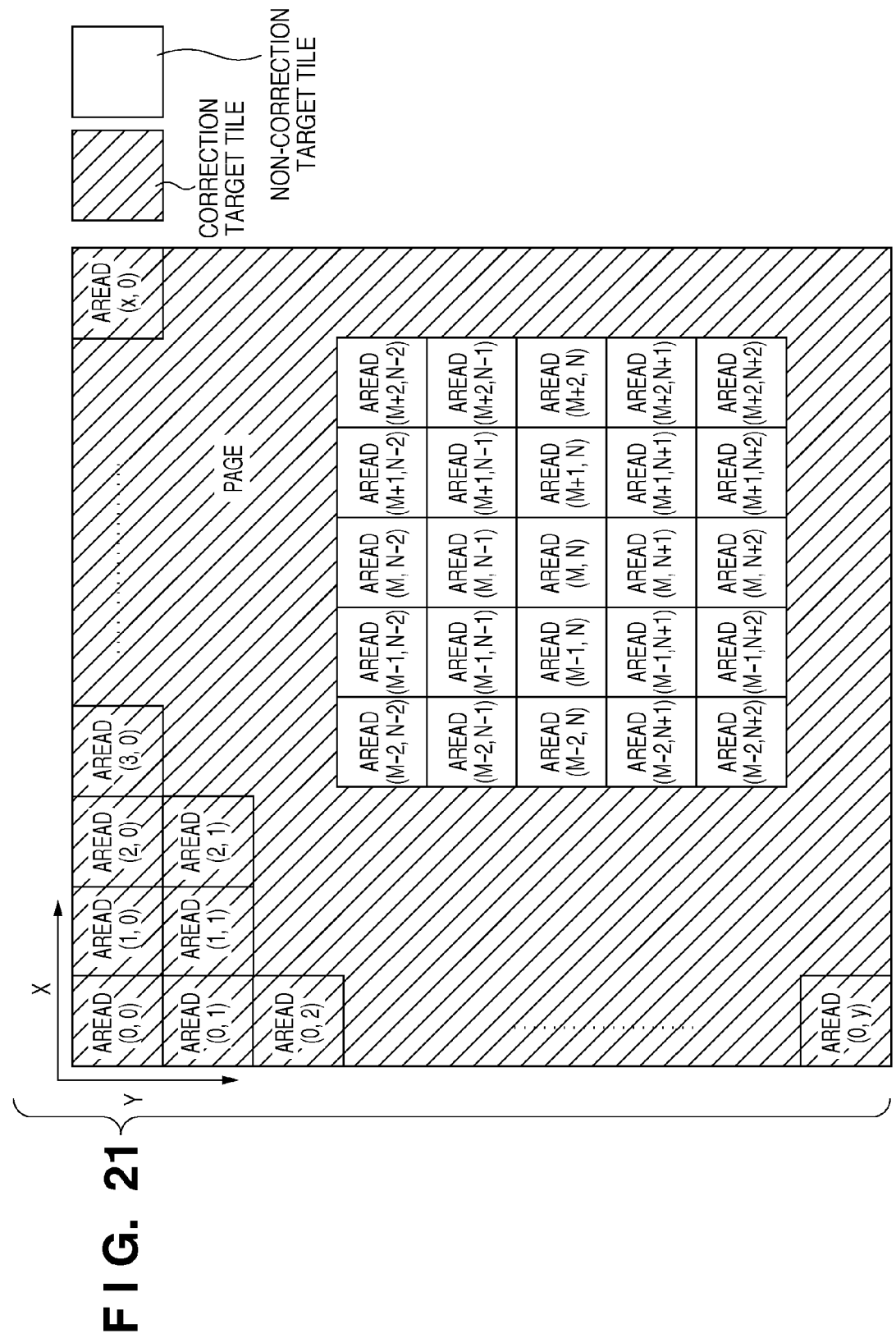
FIG. 21 is a view showing a correction value calculation method according to the first embodiment.

Next, a correction value BWH is calculated. The correction value BWH indicates a value to which the value of the tile, which is determined as a correction target by the determination processing as to whether or not the tile of interest is a correction processing target, is to be corrected. The calculation method of the correction value BWH in this embodiment will be described below with reference to FIG. 21. The correction value BWH is calculated as follows. That is, a histogram of the area representative values AREAD is calculated in association with tiles determined as correction target tiles in image data, and a mode value is selected as the correction value BWH of that page. That is, a mode value of the area representative values included in the tiles is selected as a correction value. In the example shown in FIG. 21, tiles within the range from TILE(M−2, N−2) to TILE(M+2, N+2) are determined as non-correction target tiles. In this case, the mode value of the area representative values AREAD other than the range from TILE(M−2, N−2) to TILE(M+2, N+2) is selected as the correction value BWH.

With the aforementioned processing, a tile representative value BWave and determination information as to whether or not that tile is a correction target are output for each tile. Also, information of a correction value BWH is output for the entire image data. In this embodiment, as can be seen from the example of FIG. 21, the range of a target area used to determine whether or not to apply correction to the tile of interest is different from the range of a target area used to calculate a correction value for the tile of interest. However, the present invention is not limited to this. For example, the range of an area for determination (first area) and the range of an area for correction value calculation (second area) are set to be the same range, and area representative values in that range may be used. Also, the number of tiles which configure the first area (the first number of tiles) and the number of tiles which configure the second area (the second number of tiles) are not limited to those described in this embodiment, and they may be increased/decreased as needed.

Figure 22:
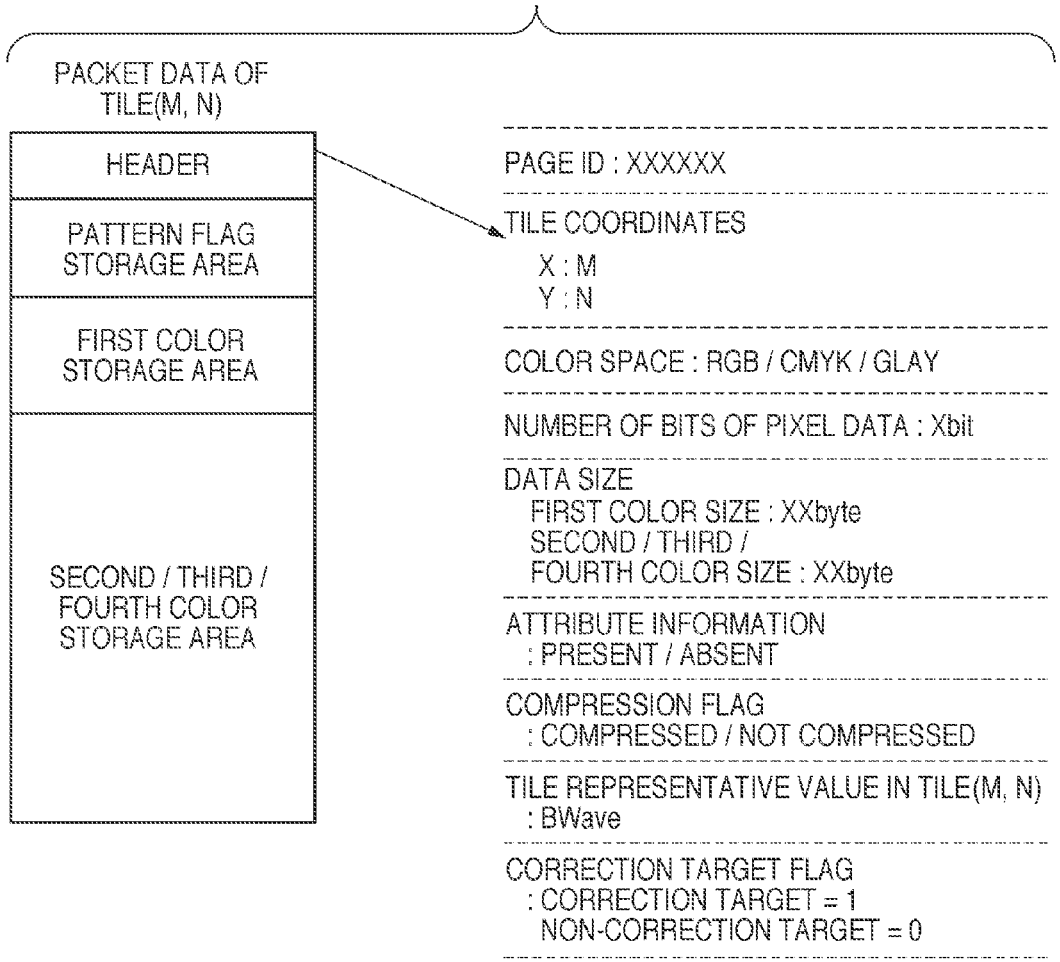
FIG. 22 is a view showing the configurations of a packet and header according to the first embodiment.

The tile representative values and information indicating a correction target tile are added to a header part of compressed data. A tile representative value BWave is added to a header part of packet data of each tile. Also, information indicating as to whether or not a tile is a correction target is added as a correction target flag to the header part of the packet data of each tile. This information reflects a determination result as to whether or not to apply correction to the tile of interest at the time of compression. FIG. 22 shows an example of header information added to packet data of a tile. In addition to header information at the time of compression, the header information includes a representative value BWave and compression target flag (in case of this embodiment, "1" for a correction target tile; "0" for a non-correction target tile) of TILE(M, N). As for the correction value BWH, as shown in FIG. 23A, the correction value BWH is added to Top header information at the time of normal compression.

Figure 24:
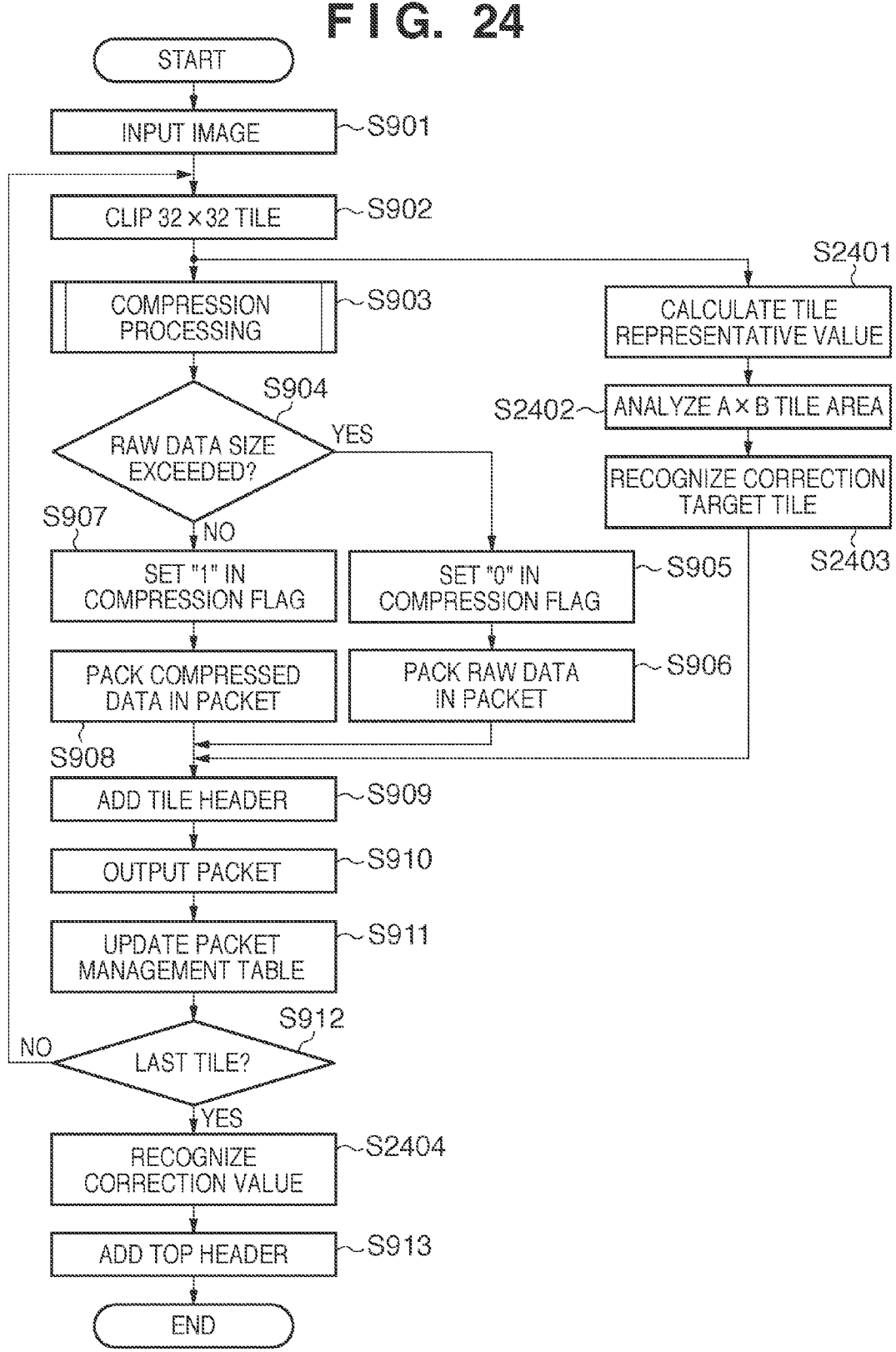
FIG. 24 is a flowchart showing the sequence of image compression/pre-correction processing according to the first embodiment.

FIG. 24 is a flowchart of this embodiment. Since the compression processing is the same as that in FIG. 9, a detailed description of processes denoted by the same step numbers will not be repeated. The processes associated with the pre-correction processing in this embodiment are steps S2401 to S2405.

After a tile is clipped, processing such as recognition for respective 2×2 pixel patterns and that of color information is executed in association with the compression processing. Parallel to this processing, the compression unit calculates a tile representative value BWave for each tile from image data in that tile (S2401). The compression unit analyzes tile representative values BWave in an A×B area based on the tile representative values (S2402). After that, the compression unit executes recognition processing as to whether or not a tile of interest is a correction target (S2403). As a result of these processes, the compression unit adds a tile representative value and correction target flag to a header part (S909), and outputs packet data (S910). Upon completion of processing for all tiles (YES in step S912), the compression unit calculates a correction value (S2404). Then, the compression unit adds the correction value to a Top header (S913). As described above, this processing ends. When compressed image data is saved in a memory or magnetic disk, a storage space of the Top header appended at the end of the processing is assured in advance before the storage position of respective packets. Respective packet data are stored in this area, and the Top header output lastly is stored in the assured space. The sequence when the pre-correction processing of this patent is executed at the time of compression has been described.

[Hardware Arrangement (for Compression Processing with Correction)]

Figure 25:
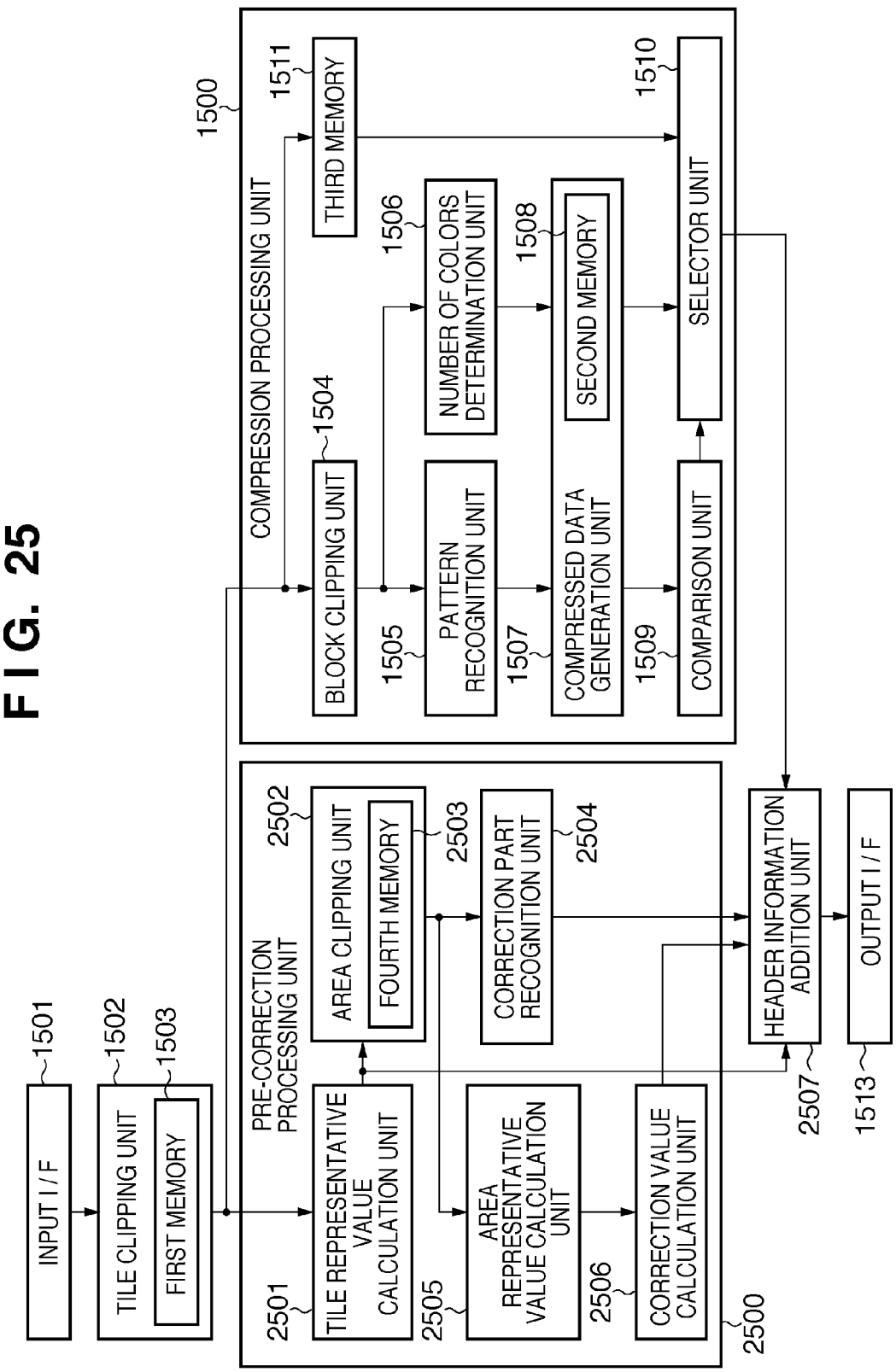
FIG. 25 is a block diagram showing the hardware arrangement for the compression/pre-correction processing according to the first embodiment.

FIG. 25 shows an example of the hardware arrangement required to implement the aforementioned compression processing. The same reference numerals denote the same parts as in FIG. 15, and a detailed description thereof will not be repeated.

The input I/F 1501 inputs raster image data. The tile clipping unit 1502 temporarily stores the input raster image data in the first memory 1503, and clips tile data of 32×32 pixels from the stored image data. The compression processing unit 1500 applies compression processing to image data of each tile clipped by the tile clipping unit 1502. A detailed description of the compression processing unit 1500 will not be repeated.

A pre-correction processing unit 2500 calculates a tile representative value and determines whether or not each tile is a correction target for image data of each tile clipped by the tile clipping unit 1502. A tile representative value calculation unit 2501 calculates an average value of data in the input tile. The tile representative value calculation unit 2501 includes, for example, an adder (not shown) used to add pixel values and a divider (not shown) used to calculate an average value from the addition result. An area clipping unit 2502 includes a memory unit such as a fourth memory 2503, and stores tile representative values BWave of respective tiles to generate A×B area information shown in FIG. 19A. A correction part recognition unit 2504 determines based on tile representative values BWave in the area generated by the area clipping area 2502 whether or not a tile of interest is a tile to be corrected. An area representative value calculation unit 2505 calculates an area representative value AREAD. In this case, a tile representative value BWave as a mode value in the area of those in the area generated by the area clipping unit 2502 is selected as an area representative value AREAD. A correction value calculation unit 2506 calculates a histogram of area representative values AREAD of tiles determined as correction target tiles in the image data, and selects a mode value as a correction value BWH of that page. A header information addition unit 2507 adds, for example, tile representative values BWave from the tile representative value calculation unit 2501 and a correction target flag from the correction part recognition unit 2504 to data output from the selector unit 1510. Then, data added with header information shown in FIG. 22 is output from the output I/F 1513. Upon completion of processing for all tiles in the image data, a Top header shown in FIG. 23A is also added.

[Density Correction Processing]

Figure 26:
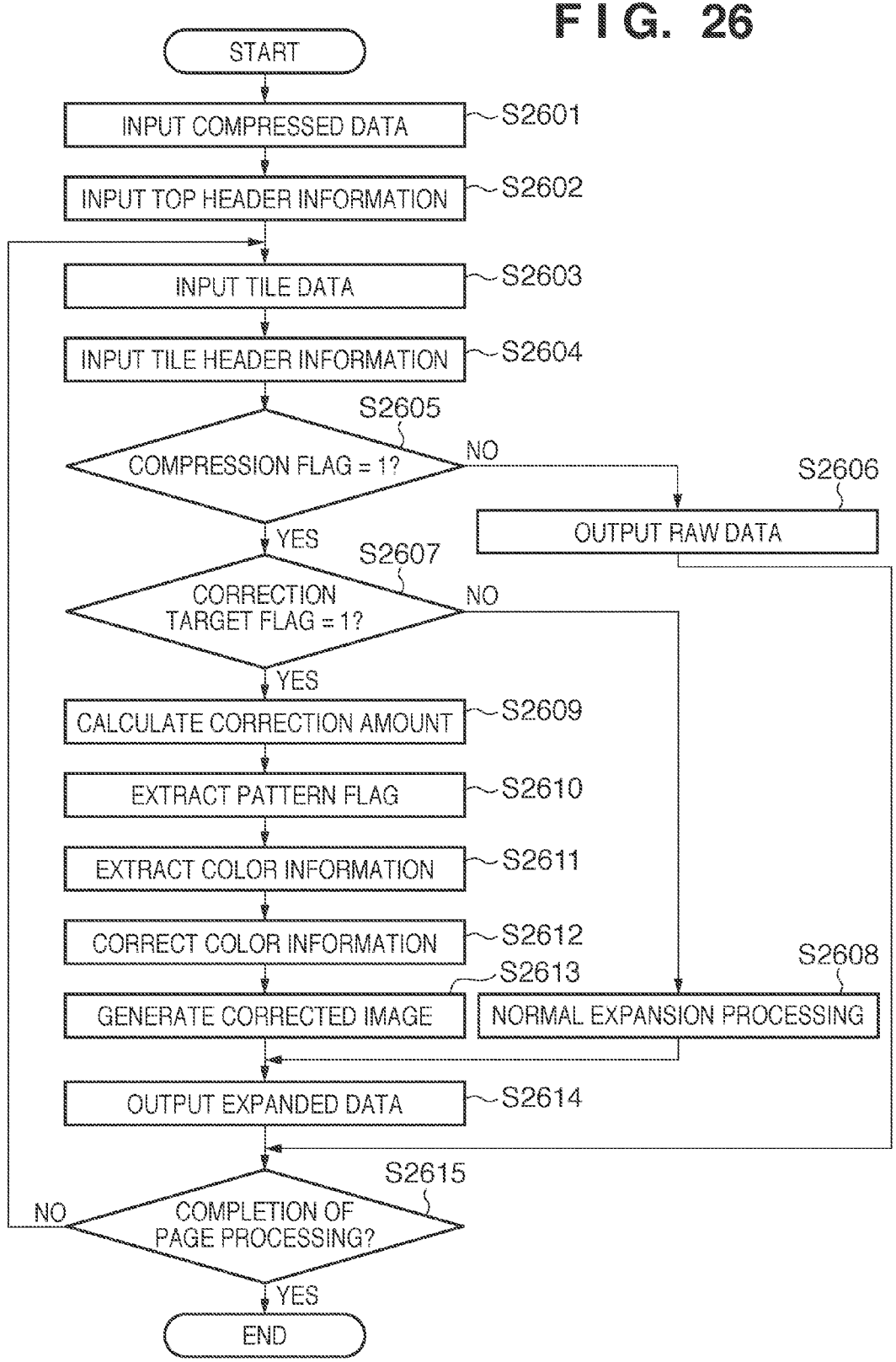
FIG. 26 is a flowchart showing the sequence of image expansion/correction processing according to the first embodiment.

A detailed example of a case in which density correction processing is executed at the same time when the compressed data is expanded will be described below. FIG. 26 shows an example of the sequence upon execution of expansion processing. When the processing starts, the expansion unit inputs compressed data (S2601). The expansion unit then refers to Top header information (S2602). At this time, the expansion unit recognizes a correction value added to the Top header. After that, the expansion unit sequentially inputs tile data for a tile to be processed (S2603). After the tile data is input, the expansion unit recognizes header information for each tile (S2604). At this time, the expansion unit recognizes a tile representative value BWave added to the header part of each tile and also recognizes by checking a correction target flag whether or not the input tile is a correction target.

Next, the expansion unit refers to a compression flag in the header information (S2605). If the compression flag is "1" (YES in step S2605), the expansion unit recognizes that compressed data is stored, and the control advances to the subsequent expansion processing. On the other hand, if the compression flag is "0" (NO in step S2605), the expansion unit recognizes that non-compressed raw data is stored, and outputs the raw data intact without any expansion processing (S2606). If the compression flag is "1" (YES in step S2605), the expansion unit recognizes that compressed data is stored, and then determines based on the value of the correction target flag whether or not that tile is a correction target (S2607). In this embodiment, if the correction target flag is "0" (NO in step S2607), the expansion unit executes normal expansion processing, as described above (S2608). As for the normal expansion processing, respective processes such as pattern flag extraction, color information extraction, and original image restoration are executed, as has been described in detail using the flowchart shown in FIG. 16. A description of the normal expansion processing will not be repeated.

If the correction target flag is "1" (YES in step S2607), the expansion unit simultaneously executes correction processing in addition to the normal expansion processing. In this case, the expansion unit calculates a correction amount (S2609). The expansion unit calculates the correction value by subtracting a correction value BWH added to the Top header from a tile representative value BWave added to the tile header part. Next, the expansion unit executes the correction processing, and then executes the expansion processing. In this case, after pattern flag extraction (S2610) and color information extraction (S2611), the expansion unit applies color information correction processing to the extracted color information (S2612). In this embodiment, each color information is corrected by adding the previously calculated correction amount to the extracted color information. Furthermore, the expansion unit applies the corrected color information to the extracted pattern information to generate a corrected image (S2613), and outputs that image as expanded data (S2614). When the aforementioned processes are complete for all tiles in the image data (YES in step S2615), the expansion processing including the correction processing ends. If tiles to be processed still remain (NO in step S2615), the process returns to step S2603, and the expansion unit repeats the processes for the next tile to be processed.

[Hardware Arrangement (for Expansion Processing with Correction)]

Figure 27:
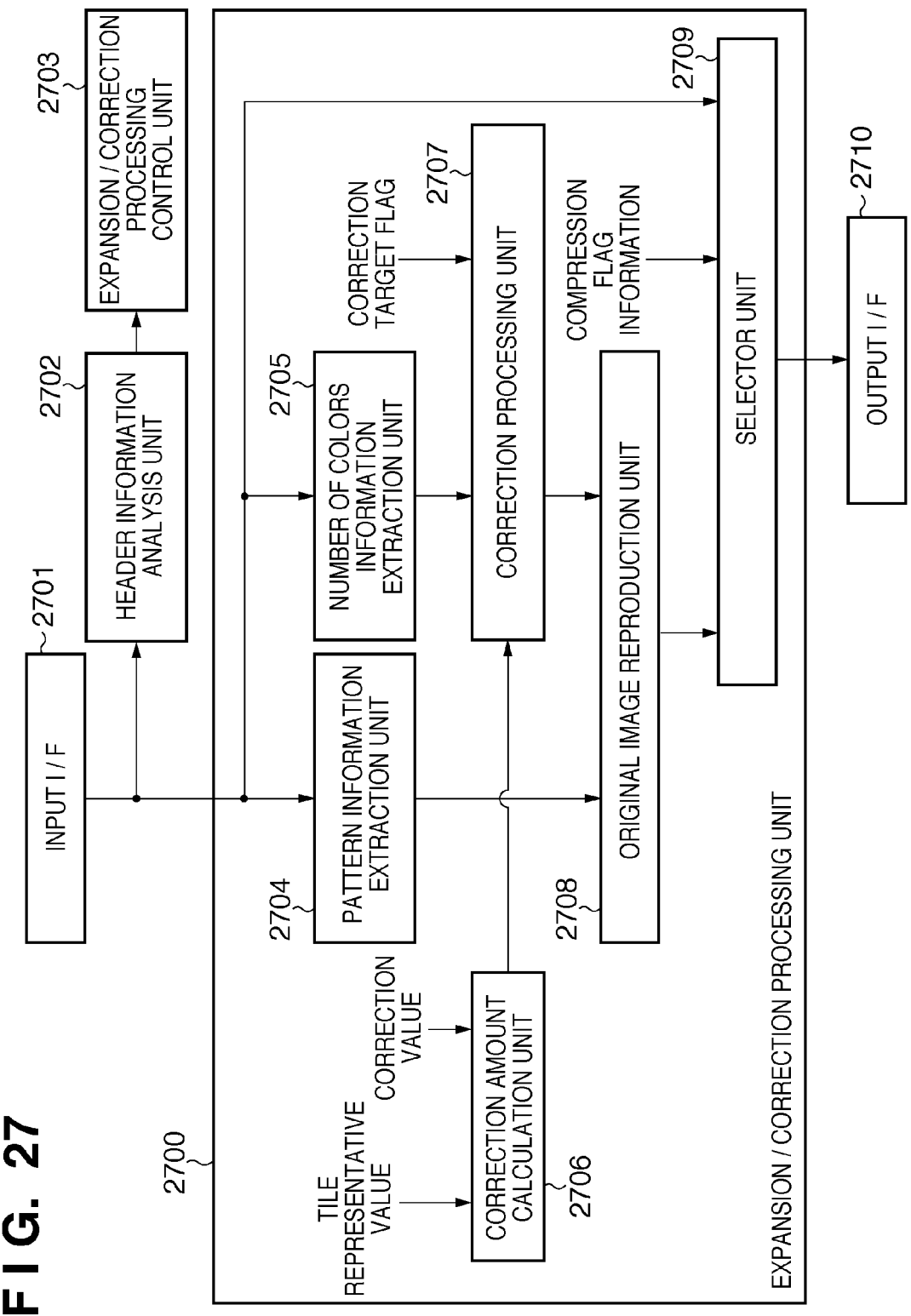
FIG. 27 is a block diagram showing the hardware arrangement for the expansion/correction processing according to the first embodiment.

FIG. 27 shows an example of the hardware arrangement required to implement the aforementioned expansion processing. An input I/F 2701 inputs compressed data. A header information analysis unit 2702 inputs header information of the input compressed data, and analyzes the contents. An expansion/correction processing control unit 2703 controls an expansion/correction processing unit 2700, which executes expansion processing, based on the header information recognized by the header information analysis unit 2702. A pattern information extraction unit 2704 extracts pattern data of 2×2 pixels from input tile data. A number of colors information extraction unit 2705 extracts color information of original image data of 2×2 pixels from the input tile data. A correction amount calculation unit 2706 calculates a correction amount based on a tile representative value BWave and correction value BWH recognized by the header information analysis unit 2702. The correction amount calculation unit 2706 includes a subtractor (not shown) used to subtract the tile representative value from the correction value. When it is determined based on a correction target flag recognized by the header information analysis unit 2702 that the tile to be processed is not a correction target, a correction processing unit 2707 skips correction for the extracted color information and outputs the data to a next original image reproduction unit 2708. When the tile to be processed is a correction target, the correction processing unit 2707 adds the previously calculated correction amount to the extracted color information, and then outputs the data to the next original image reproduction unit 2708. The original image reproduction unit 2708 restores an original state of 2×2 pixels based on the pattern information recognized by the pattern information extraction unit 2704 and the color information output from the correction processing unit 2707. When it is determined based on compression flag information recognized by the header information analysis unit 2702 that input packet data is non-compressed raw data, a selector unit 2709 outputs raw data by excluding a header part from the input packet data. On the other hand, when the input packet data is compressed data, the selector unit 2709 outputs image data restored by the original image reproduction unit 2708. The restored data which has undergone the aforementioned processes is output from an output I/F 2710.

As described above, according to the present invention, the pre-correction processing such as unevenness detection and correction value calculation processes is executed simultaneously with data compression, and data correction processing is executed simultaneously with data expansion. Then, the efficiency of the color/density unevenness correction processing can be improved, although it conventionally requires manual correction settings and a plurality of times of image processing to be applied to the entire page, and imposes heavy loads on both the circuit scale and processing time. That is, an increase in hardware required for the correction processing can be reduced, and a processing time required for the correction processing can be greatly reduced.

Second Embodiment

The first embodiment has explained the correction for grayscale data. The second embodiment will explain correction processing for RGB color image data. Differences from the first embodiment are as follows.

As for a tile representative value, in case of grayscale data, data BWave for one color is held. However, in this embodiment, tile representative values Rave, Gave, and Bave for respective R, G, and B color attributes are held. In case of grayscale data, whether or not a tile is a correction target is determined using the tile representative value BWave. However, in this embodiment, determination is made using an all-data average value AVE of the R, G, and B tile representative values Rave, Gave, and Bave. As for a correction value as well, in case of grayscale data, data BWH for one color is held. In this embodiment, correction values RH, GH, and BH for respective R, G, and B color attributes are held.

Correction processing for RGB color image data will be described in detail below. Since compression processing and expansion processing of image data are the same as those in the first embodiment, a detailed description thereof will not be repeated in this embodiment.

[Pre-Correction Processing]

Figure 18B:
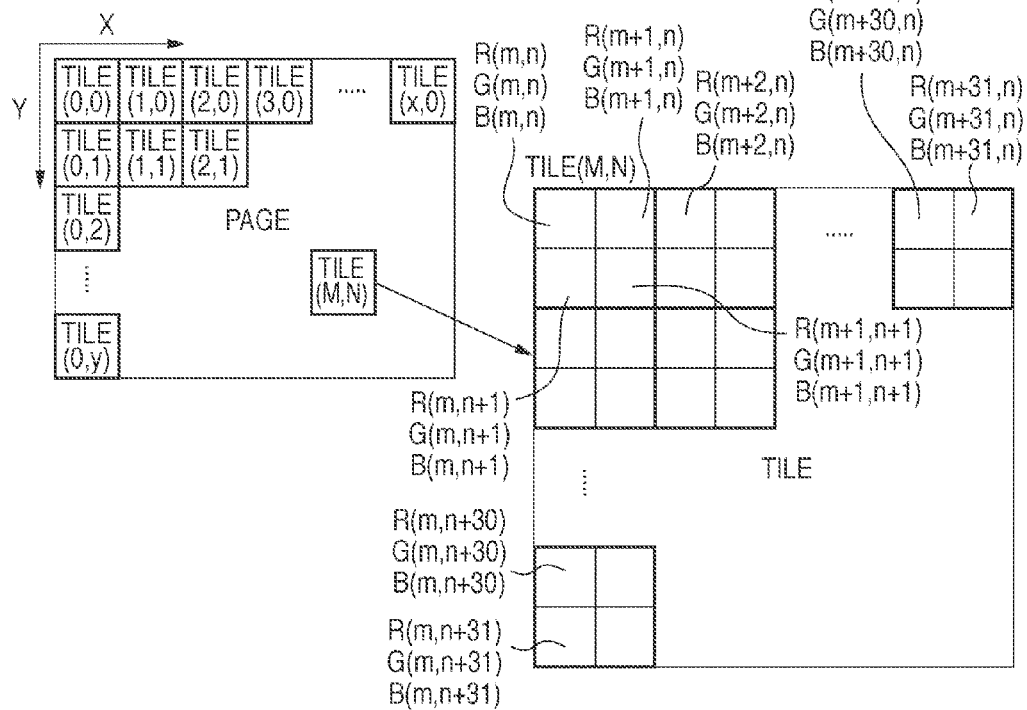

Pre-correction processing to be executed simultaneously with compression processing will be described in detail first. As shown in FIG. 18B, as in the first embodiment, tile data of 32×32 pixels is clipped from image data in a page. A tile at coordinates (M, N) includes data from coordinates (0, 0) to coordinates (31, 31) in the tile. In this embodiment, each of RGB data (R, G, B) includes 8-bit data.

R, G, and B tile representative values Rave, Gave, and Bave are calculated. In this embodiment, average values of R, G, and B data of all pixels in a tile are calculated as tile representative values Rave, Gave, and Bave of respective colors. Next, in order to determine whether or not each tile is a correction processing target, an all-data average value AVE is calculated. In this case, the all-data average value is calculated by averaging the tile representative values Rave, Gave, and Bave of respective colors. Then, whether or not each tile is a correction processing target is determined using the all-data average value AVE. This method will be described below with reference to FIG. 19B. Assume that a tile at coordinates (M, N) is selected as a tile of interest. An area including a plurality of tiles, that is, A tiles in the main scan direction and B tiles in the sub-scan direction to have the tile of interest as the center is also selected.

This embodiment will exemplify a case in which A=5 and B=5. In this case, the area of the tile of interest (M, N) includes tiles within a region from coordinates (M−2, N−2) to coordinates (M+2, N+2) to have the tile of interest as the center. A histogram of all-data average values AVE of tiles included in the area is calculated. When the all-data average values AVE of all the tiles within the area fall within the range of a pre-set value SL, the A×B area is determined as an "even part", and the tile of interest is determined as a tile "to which correction processing is applied". When the all-data average values in the area do not fall within the specific range, the A×B area is determined to be "not an even part", and the tile of interest is determined as a tile "to which correction processing is not applied". A mode value of all the representative values in the area is selected as an area representative value AREAD.

Figure 19B:
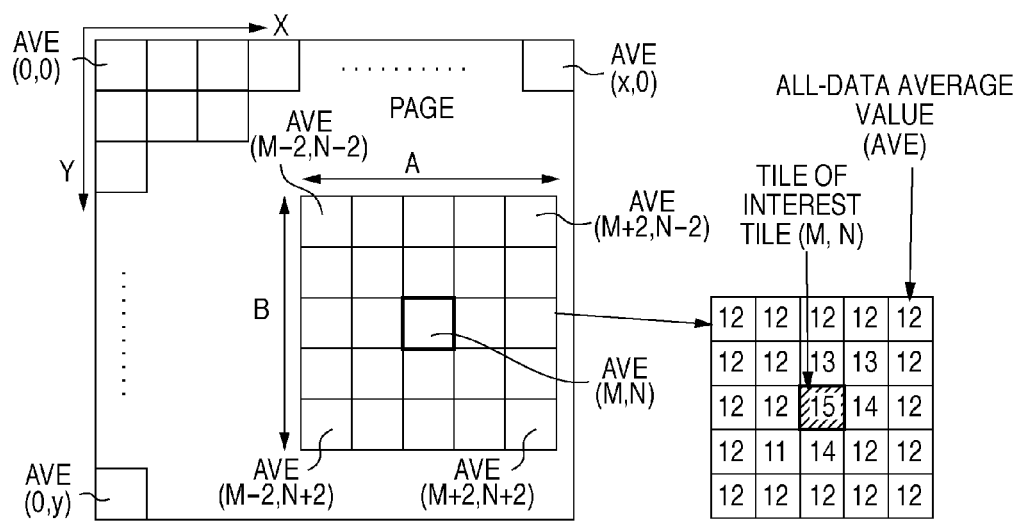

A practical example will be described below with reference to FIGS. 19B and 20B. Assume that all-data average values AVE in an area of 5×5 tiles having a tile at coordinates (M, N) as a tile of interest have values ranging from "12" to "15", as shown in FIG. 19B. A histogram of all-data average values in this area is calculated, as shown in FIG. 20B. Using this histogram, a distribution of all-data average values in the area is confirmed so as to determine a correction target. In this embodiment, since the all-data average values AVE in the area fall within the range of the pre-set value (SL=5 in this embodiment), the A×B area is determined as an "even part", and the tile of interest is determined as a tile "to which correction processing is applied". An all-data average value "12" having a highest frequency of those in the area is selected as an area representative value AREAD(M, N) when the tile at coordinates (M, N) is selected as the tile of interest. That is, a mode value is selected as the area representative value.

R, G, and B correction values RH, GH, and BH are then calculated. The R, G, and B correction values RH, GH, and BH indicate values to which R, G, and B values of a tile, which is determined as a correction target by determination as to whether or not the tile is the correction processing target, are to be corrected. The R, G, and B correction values RH, GH, and BH are calculated as follows. A histogram of area representative values AREAD is calculated for tiles determined as correction target tiles in the image data, and a mode value is selected as a representative average value AVED of that page. Average values of R, G, and B tile representative values Rave, Gave, and Bave of tiles which match the page representative value AVED are calculated for respective colors in association with tiles determined as correction target tiles in the image data as R, G, and B correction values RH, GH, and BH.

With the above processing, R, G, and B tile representative values Rave, Gave, and Bave and determination information as to whether or not each tile is a correction target are recognized for each tile. Also, pieces of information of R, G, and B correction values RH, GH, and BH are recognized for the entire image data. These pieces of information are added to a header part of compressed data. The R, G, and B tile representative values Rave, Gave, and Bave are added to a header part of packet data of each tile, and information as to whether or not each tile is a correction target is also added to the header part of the packet data of the tile as a correction target flag.

Figure 28:
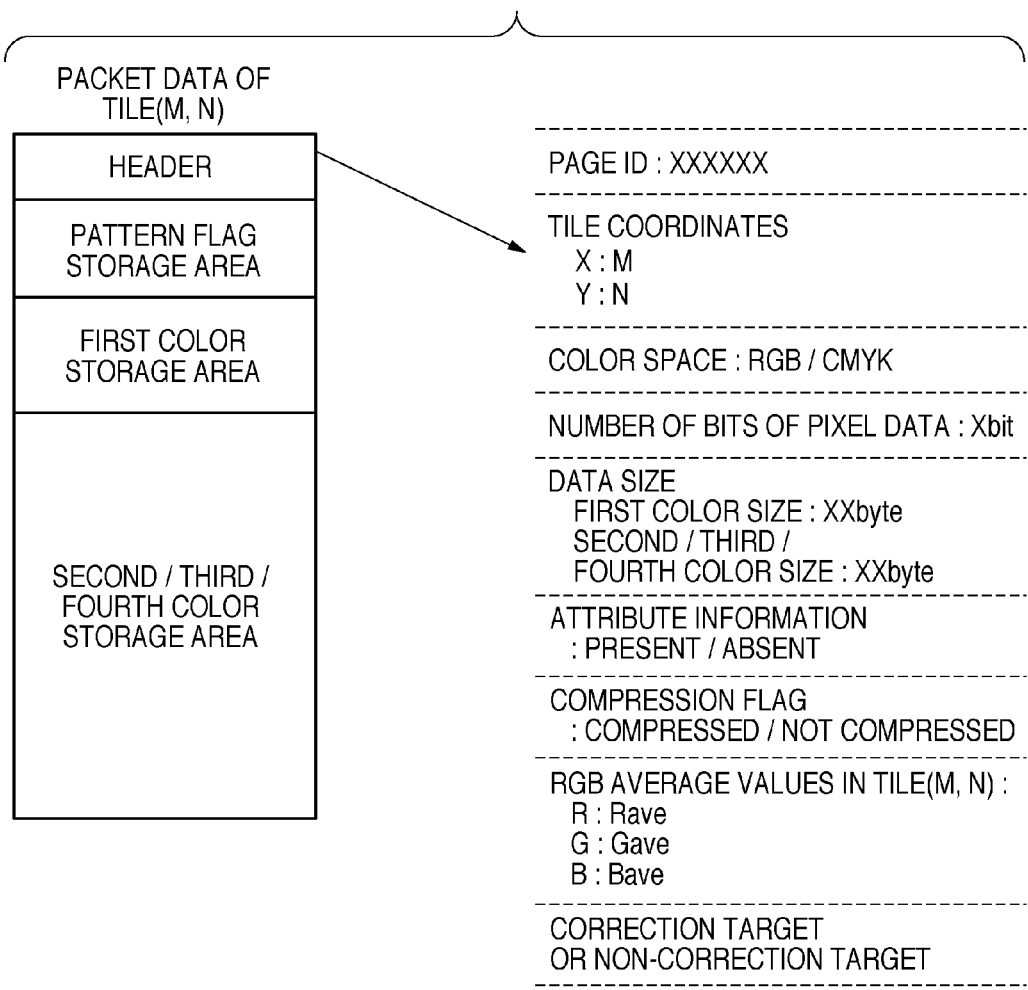
FIG. 28 is a view showing the configurations of a packet and header according to the second embodiment.

FIG. 28 shows an example of header information added to packet data of each tile. In addition to header information at the time of compression, the header information has R, G, and B tile representative values Rave, Gave, and Bave and a correction target flag of TILE(M, N). In this embodiment, when the tile of interest is a correction target tile, "1" is held as a correction target flag; when the tile of interest is a non-correction target tile, "0" is held as the correction target flag.

As shown in FIG. 23B, the values of the R, G, and B correction values RH, GH, and BH are added in addition to Top header information at the time of normal compression, which has been explained in detail using FIG. 14.

Figure 29:
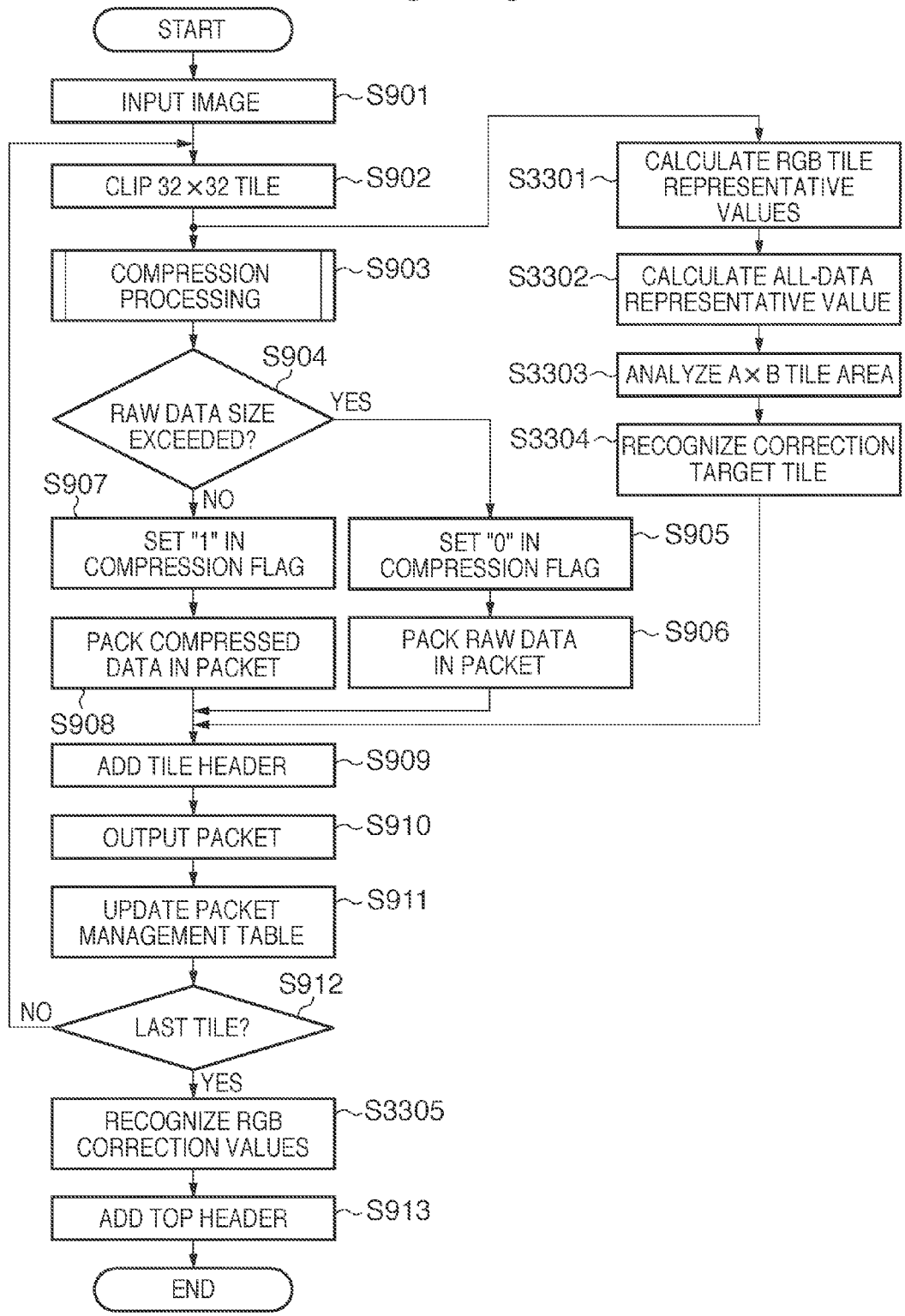
FIG. 29 is a flowchart showing the sequence of image compression/pre-correction processing according to the second embodiment.

FIG. 29 is a flowchart of pre-correction processing executed at the time of compression of this embodiment. Since compression processing is the same as that in FIG. 9, a detailed description of processes denoted by the same step numbers will not be repeated. Processes associated with the pre-correction processing of this embodiment are steps S3301 to S3305. After a tile is clipped, the compression processing such as recognition of 2×2 pixel patterns and that of color information is executed. Parallel to this processing, a compression unit calculates R, G, and B tile representative values Rave, Gave, and Bave for each tile from image data in the tile (S3301). Then, the compression unit calculates an all-data average value AVE in the tile based on the representative values of respective colors (S3302). After that, the compression unit analyzes the all-data average values AVE in tiles in an A×B area (S3303). The compression unit then executes recognition processing as to whether or not a tile of interest is a correction target based on the analysis result (S3304). As a result of the process in step S3304, the compression unit adds the R, G, and B tile representative values Rave, Gave, and Bave and correction target flag to a header part of data packed in step S908 or S906 (S909). Then, the compression unit outputs packet data (S910).

Upon completion of processing for all tiles (YES in step S912), the compression unit calculates R, G, and B correction values RH, GH, and BH (S3305). Then, the compression unit adds the correction values to a Top header (S913), and outputs the Top header. Note that when compressed image data is stored in a memory or magnetic disk, the compression unit assures a storage space of the Top header added at the end of the processing before respective packets, and stores respective packet data. The compression unit then stores the Top header, which is output lastly, in the assured space. The sequence when the pre-correction processing of this patent is executed at the time of compression has been described.

[Hardware Arrangement (for Compression Processing with Color Image Correction Processing)]

Figure 30:
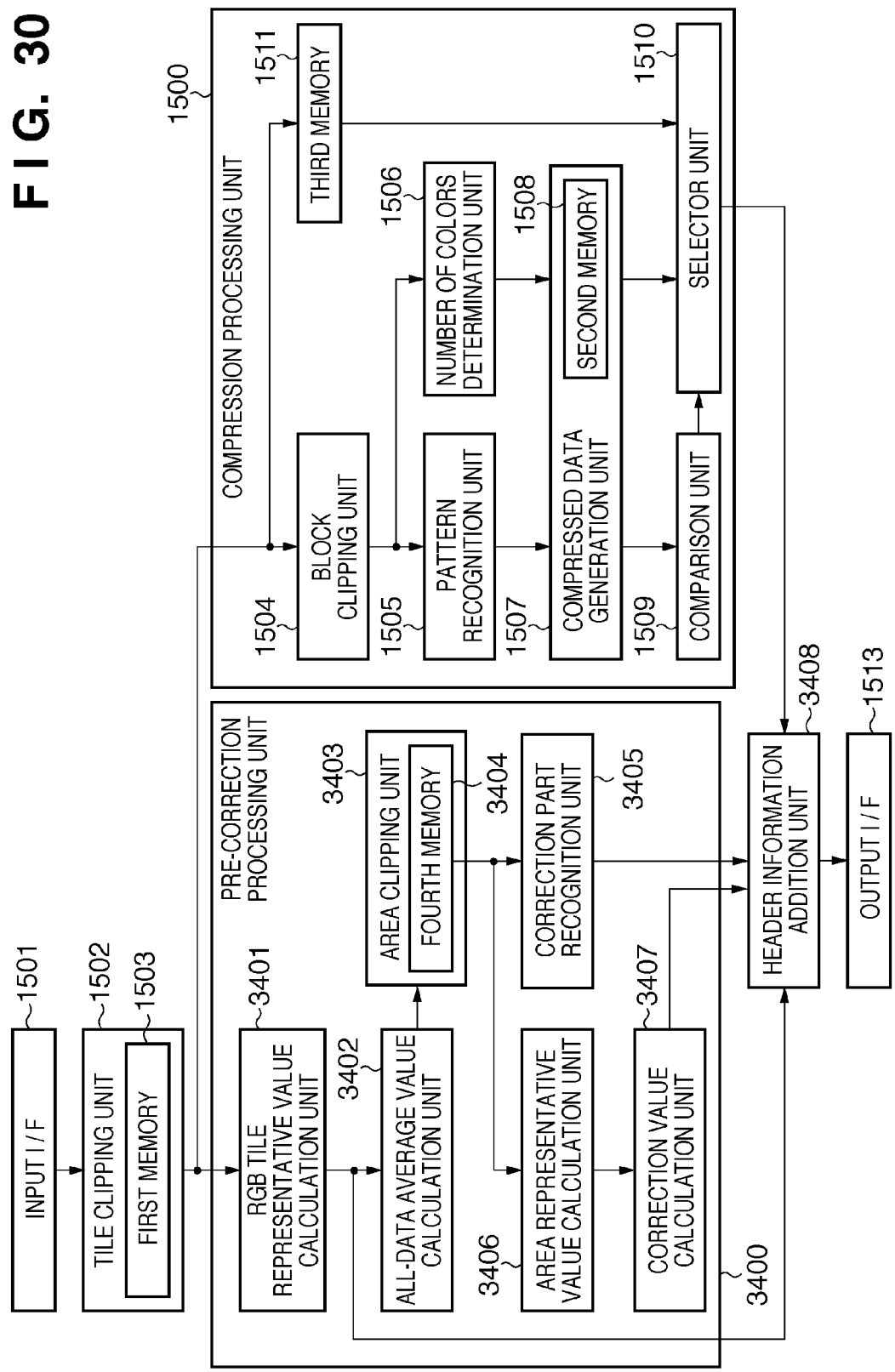
FIG. 30 is a block diagram showing the hardware arrangement for the compression/pre-correction processing according to the second embodiment.

FIG. 30 shows an example of the hardware arrangement required to implement the aforementioned compression processing. Since the same reference numerals as those in FIG. 15 denote components which have already been explained using FIG. 15, a detailed description thereof will not be repeated.

An input I/F 1501 inputs raster image data. A tile clipping unit 1502 temporarily stores the input raster image data in a first memory 1503, and clips tile data of 32×32 pixels from the stored image data. A compression processing unit 1500 applies compression processing to image data of the tile clipped by the tile clipping unit 1502. Since the compression processing unit 1500 has already been described, a detailed description thereof will not be repeated.

A pre-correction processing unit 3400 calculates tile representative values and determines whether or not each tile is a correction target for image data of each tile clipped by the tile clipping unit 1502. An RGB tile representative value calculation unit 3401 calculates R, G, and B average values of data in the input tile. The RGB tile representative value calculation unit 3401 includes, for example, adders (not shown) used to add pixel values, and dividers (not shown) used to calculate average values from the addition results. An all-data average value calculation unit 3402 calculates an all-data average value AVE in the tile. In this embodiment, the all-data average value calculation unit 3402 includes an adder used to add tile representative values of respective colors, and a divider (not shown) used to calculate an average value from the addition result, so as to calculate an average value of the input R, G, and B tile representative values Rave, Gave, and Bave.

An area clipping unit 3403 includes a memory unit such as a fourth memory 3404. Also, the area clipping unit 3403 stores the all-data average values AVE of respective tiles to generate A×B area information, as shown in FIG. 19B. A correction part recognition unit 3405 determines based on the all-data average values AVE of respective tiles in the area generated by the area clipping unit 3403 whether or not each tile is that to be corrected. An area representative value calculation unit 3406 calculates an area representative value. In this embodiment, an all-data average value AVE as a mode value of those of respective tiles in the area generated by the area clipping unit 3403 is selected as an area representative value AREAD. A correction value calculation unit 3407 calculates R, G, and B correction values RH, GH, and BH. The correction value calculation unit 3407 calculates a histogram of area representative values AREAD in association with tiles determined as correction target tiles in the image data, and selects a mode value as a page representative value AVED.

Average values for respective colors of R, G, and B tile representative values Rave, Gave, and Bave of tiles, which match the page representative value AVED, are calculated in association with tiles determined as correction target tiles in the image data, as R, G, and B correction values RH, GH, and BH. A header information addition unit 3408 adds R, G, and B tile representative values Rave, Gave, and Bave from the RGB tile representative value calculation unit 3401 and a correction target flag from the correction part recognition unit 3405 to compressed image data output from a selector unit 1510. In this case, data added with header information shown in FIG. 28 is output from an output I/F 1513. Upon completion of processing for all tiles in the image data, a Top header shown in FIG. 23B is also added by the header information addition unit 3408.

[Density Correction Processing]

Figure 31:
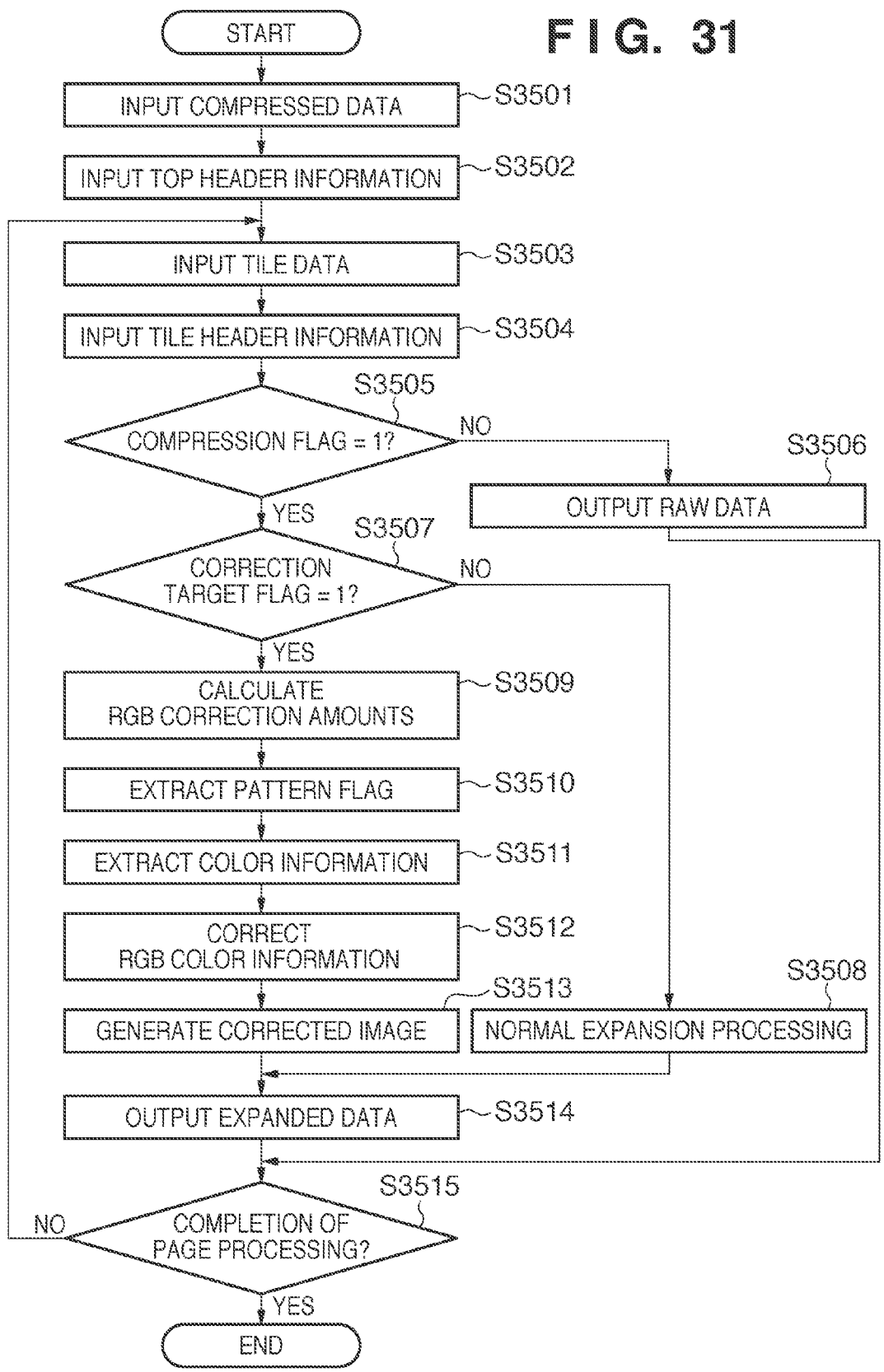
FIG. 31 is a flowchart showing the sequence of image expansion/correction processing according to the second embodiment.

A detailed example of a case in which density correction processing is simultaneously executed when the compressed data is expanded. FIG. 31 shows an example of the sequence upon execution of expansion processing. When the processing starts, an expansion unit inputs compressed data (S3501). The expansion unit refers to Top header information (S3502). At this time, correction values added to the Top header part are recognized. After that, the expansion unit sequentially inputs packet data of a tile (S3503). After the tile data is input, the expansion unit recognizes header information for each tile (S3504). At this time, the expansion unit recognizes R, G, and B tile representative values Rave, Gave, and Bave added to a header part of each tile, and also recognizes by checking a correction target flag whether or not the input tile is a correction target.

Then, the expansion unit refers to a compression flag in the header information (S3505). In this case, if the compression flag is "1" (YES in step S3505), the expansion unit recognizes that compressed data is stored, and the control advances to the subsequent expansion processing. On the other hand, if the compression flag is "0" (NO in step S3505), the expansion unit recognizes that non-compressed raw data is stored, and outputs the raw data intact without any expansion processing (S3506). If the compression flag is "1" (YES in step S3505), the expansion unit recognizes that compressed data is stored, and then determines based on the value of the correction target flag whether or not that tile is a correction target (S3507).

In this embodiment, if the correction target flag is "0" (NO in step S3507), the expansion unit executes normal expansion processing (S3508), as has been described in detail previously. As for the normal expansion processing, the expansion unit executes respective processes such as pattern flag extraction, color information extraction, and original image restoration, as has been described in detail using the flowchart shown in FIG. 16. A description of the normal expansion processing will not be repeated. If the correction target flag is "1" (YES in step S3507), the expansion unit simultaneously executes correction processing in addition to the normal expansion processing. In this case, the expansion unit calculates R, G, and B correction amounts (S3509). The expansion unit calculates the R, G, and B correction amounts by subtracting R, G, and B correction values RH, GH, and BH added to the Top header from R, G, and B tile representative values Rave, Gave, and Bave added to a tile header.

Next, the expansion unit executes the correction processing, and then executes the expansion processing. In this case, after pattern flag extraction (S3510) and color information extraction (S3511), the expansion unit applies color information correction processing to respective pieces of extracted RGB color information (S3512). In this embodiment, the expansion unit corrects color information by adding the previously calculated R, G, and B correction amounts to R, G, and B data of each extracted color information. The expansion unit applies the corrected color information to the extracted pattern information to generate a corrected image (S3513). Then, after step S3513 or S3508, the expansion unit outputs that image as expanded data (S3514). When the aforementioned processes are complete for all tiles in the image data (YES in step S3515), the expansion unit ends the expansion processing with the correction processing.

[Hardware Arrangement (for Expansion Processing with Color Image Correction)]

Figure 32:
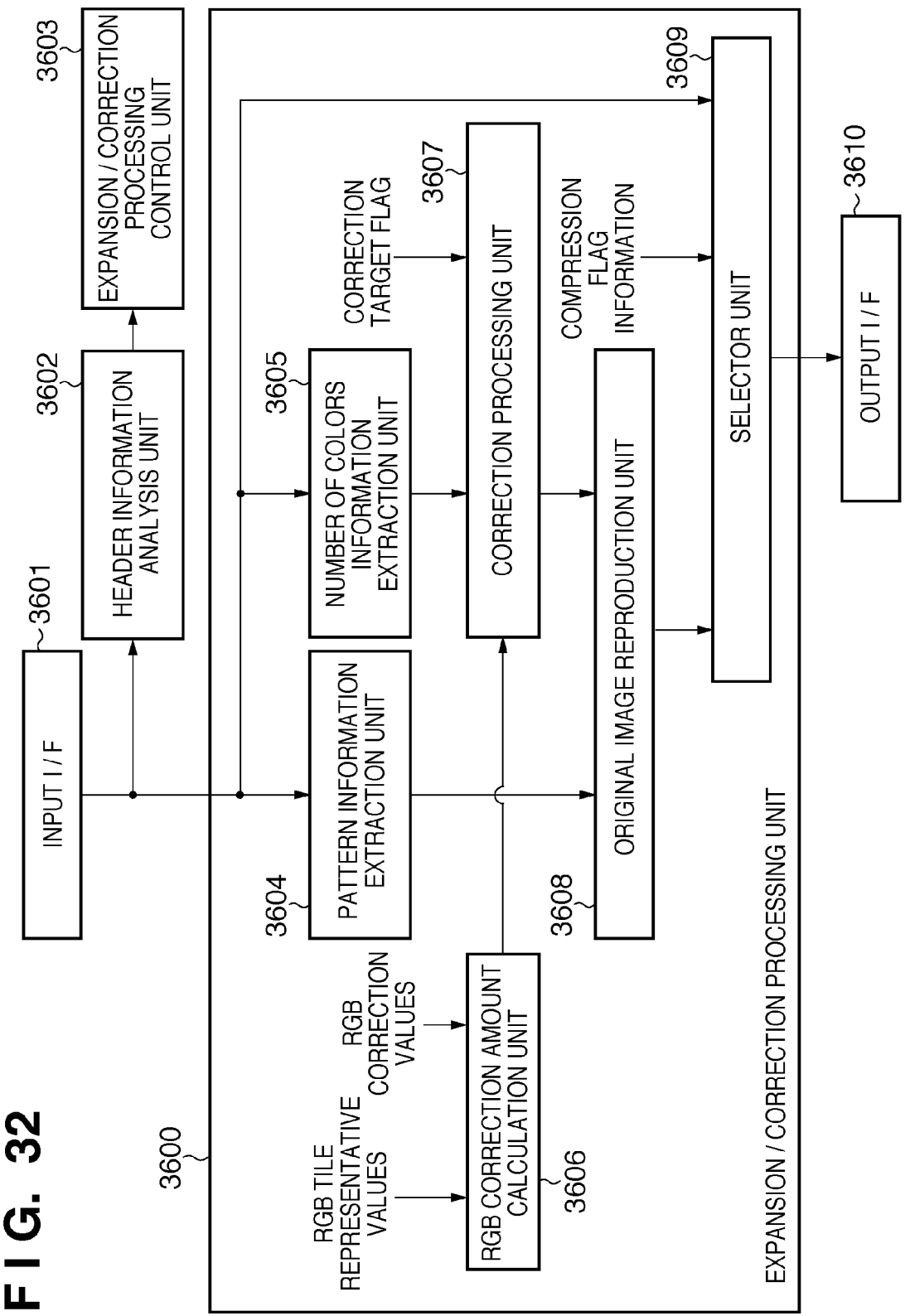
FIG. 32 is a block diagram showing the hardware arrangement for the expansion/correction processing according to the second embodiment.

FIG. 32 shows an example of the hardware arrangement required to implement the aforementioned expansion processing. An input I/F 3601 inputs compressed data. A header information analysis unit 3602 inputs header information of the input compressed data, and analyzes the contents. An expansion/correction processing control unit 3603 controls an expansion/correction processing unit 3600, which executes expansion processing, based on the header information recognized by the header information analysis unit 3602. A pattern information extraction unit 3604 extracts pattern data of 2×2 pixels from input tile data. A number of colors information extraction unit 3605 extracts color information of original image data of 2×2 pixels from the input tile data.

An RGB correction amount calculation unit 3606 calculates R, G, and B correction amounts based on R, G, and B tile representative values Rave, Gave, and Bave, and R, G, and B correction values RH, GH, and BH recognized by the header information analysis unit 3602. The correction amount calculation unit 3606 includes a subtractor used to subtract the tile representative value of each color from the correction value of each color. When it is determined based on a correction target flag recognized by the header information analysis unit 3602 that the tile to be processed is not a correction target, a correction processing unit 3607 skips correction for the extracted color information and outputs data to a next original image reproduction unit 3608. When the tile to be processed is a correction target, the correction processing unit 3607 adds the previously calculated R, G, and B correction amounts to R, G, and B data of the extracted color information, and then outputs data to the next original image reproduction unit 3608.

The original image reproduction unit 3608 restores an original state of 2×2 pixels based on the pattern information recognized by the pattern information extraction unit 3604 and the color information output from the correction processing unit 3607. When it is determined based on compression flag information recognized by the header information analysis unit 3602 that input packet data is non-compressed raw data, a selector unit 3609 outputs raw data by excluding a header part from the input packet data. On the other hand, when the input packet data is compressed data, the selector unit 3609 outputs image data restored by the original image reproduction unit 3608. The restored data which has undergone the aforementioned processes is output from an output I/F 3610.

As described above, even for R, G, and B color image data, the pre-correction processing such as unevenness detection and correction value calculation processes is executed simultaneously with data compression, and data correction processing is executed simultaneously with data expansion. Then, the efficiency of the color/density unevenness correction processing can be improved, although it conventionally requires manual correction settings and a plurality of times of image processing to be applied to the entire page, and imposes heavy loads on both the circuit scale and processing time. That is, an increase in hardware required for the correction processing can be reduced, and a processing time required for the correction processing can be greatly reduced.

Third Embodiment

The first embodiment has explained the correction for grayscale data, and the second embodiment has explained the correction processing for RGB color image data. However, the correction processing unwantedly applies correction to a gradation image, thus posing a problem.

Figure 19C:
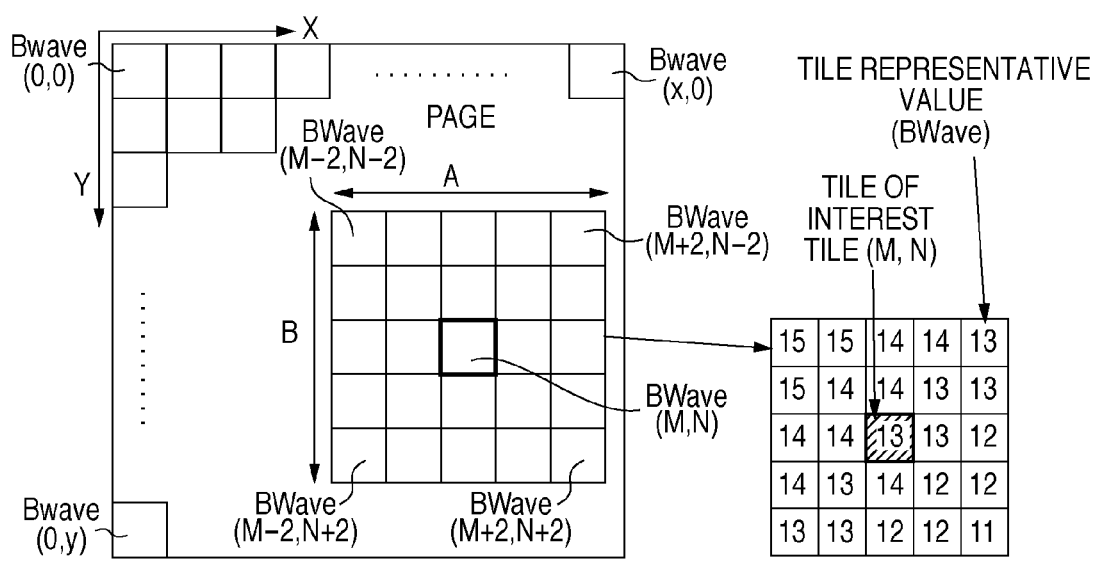

For example, upon inputting data which is grayscale data of a gradation image that becomes darker in the lower right direction in an A×B area, a tile representative value BWave assumes a value shown in FIG. 19C.

A histogram of tile representative values in this area is calculated, as shown in FIG. 20C. In the first embodiment, since all tile representative values in the area fall within the range of a pre-set value (SL=5 in this embodiment), the A×B area is determined as an "even part", and a tile of interest is determined as a tile "to which correction processing is applied". In this case, correction processing based on a correction value BWH is executed for tiles in a gradation image in expansion/correction processing, and the gradation image is disturbed.

Hence, this embodiment executes gradation region determination for a part which is to undergo determination as to whether or not a tile of interest is a correction target in the pre-correction processing (A×B tile area analysis). As a result, when it is recognized that the tile of interest is included in a gradation region, the tile of interest is set as a non-correction target, thus preventing any image disturbance due to correction processing applied to a gradation part.

This embodiment executes processing in correction target tile recognition (S2403) in the flowchart of FIG. 24, which has been described in the first embodiment. Also, this embodiment relates to processing in a pre-correction processing unit 2500 in the block diagram of FIG. 25. Hence, a detailed description of other processes which have already been explained will not be repeated.

[Recognition of Gradation Image]

As shown in FIG. 33, features of gradation image data exhibit three states, that is, a state in which a value BWave is always continuously rising (increase), a state in which it is always continuously falling (decrease), and a state in which the same value continues (constant) with increasing coordinate M in an A direction (main scan direction) of the area. Also, the features exhibit three states, that is, a state in which a value BWave is always continuously rising (increase), a state in which it is always continuously falling (decrease), and a state in which the same value continues (constant) with increasing coordinate N in a B direction (sub-scan direction) of the area.

That is, in this embodiment, whether or not pixel values are always increasing, decreasing, or constant is determined in both the main scan direction and sub-scan direction, thus determining a gradation region. Such features of gradation are recognized, and are used in determination associated with correction of an area of interest.

Gradation recognition will be described in detail below with reference to FIGS. 34A and 34B. In the A direction of the A×B area, respective rows, that is, (A−2)-th, (A−1)-th, (A)-th, (A+1)-th, and (A+2)-th rows are set, as shown in FIG. 34A, Then, for each row, differences between neighboring tile representative values are calculated. For example, for the (A−2)-th row, the following calculations are made:

$$BWave(M-2,N-2)-BWave(M-1,N-2)$$

$$BWave(M-1,N-2)-BWave(M,N-2)$$

$$BWave(M,N-2)-BWave(M+1,N-2)$$

$$BWave(M+1,N-2)-BWave(M+2,N-2)$$

Similarly, for the (A)-th row, the following calculations are made:

$$BWave(M-2,N)-BWave(M-1,N)$$

$$BWave(M-1,N)-BWave(M,N)$$

$$BWave(M,N)-BWave(M+1,N)$$

$$BWave(M+1,N)-BWave(M+2,N)$$

In the B direction of the A×B area, respective columns, that is, (B−2)-th, (B−1)-th, (B)-th, (B+1)-th, and (B+2)-th columns are set, as shown in FIG. 34B, Then, for each column, differences between neighboring tile representative values are calculated. For example, for the (B−1)-th column, the following calculations are made:

$$BWave(M-1,N-2)-BWave(M-1,N-1)$$

$$BWave(M-1,N-1)-BWave(M-1,N)$$

$$BWave(M-1,N)-BWave(M-1,N+1)$$

$$BWave(M-1,N+1)-BWave(M-1,N+2)$$

Similarly, for the (B+2)-th column, the following calculations are made:

$$BWave(M+2,N-2)-BWave(M+2,N-1)$$

$$BWave(M+2,N-1)-BWave(M+2,N)$$

$$BWave(M+2,N)-BWave(M+2,N+1)$$

$$BWave(M+2,N+1)-BWave(M+2,N+2)$$

The calculation results of the A rows and B columns are analyzed, and it is determined whether or not a referring area is a gradation region. The determination method is as follows.

When all the calculation results of the A rows assume positive values, and when all the calculation results of the B columns assume positive values or negative values or "0", the referring area is determined as a gradation region, and the tile of interest is determined as a "non-correction target".

When all the calculation results of the A rows assume negative values, and when all the calculation results of the B columns assume positive values or negative values or "0", the referring area is determined as a gradation region, and the tile of interest is determined as a "non-correction target".

When all the calculation results of the A rows assume "0", and when all the calculation results of the B columns assume positive values or negative values, the referring area is determined as a gradation region, and the tile of interest is determined as a "non-correction target".

When all the calculation results of the A rows assume "0", and all the calculation results of the B columns assume "0", since the referring area includes identical values and need not be corrected, the tile of interest is determined as a "non-correction target".

[Compression Processing]

Figure 35:
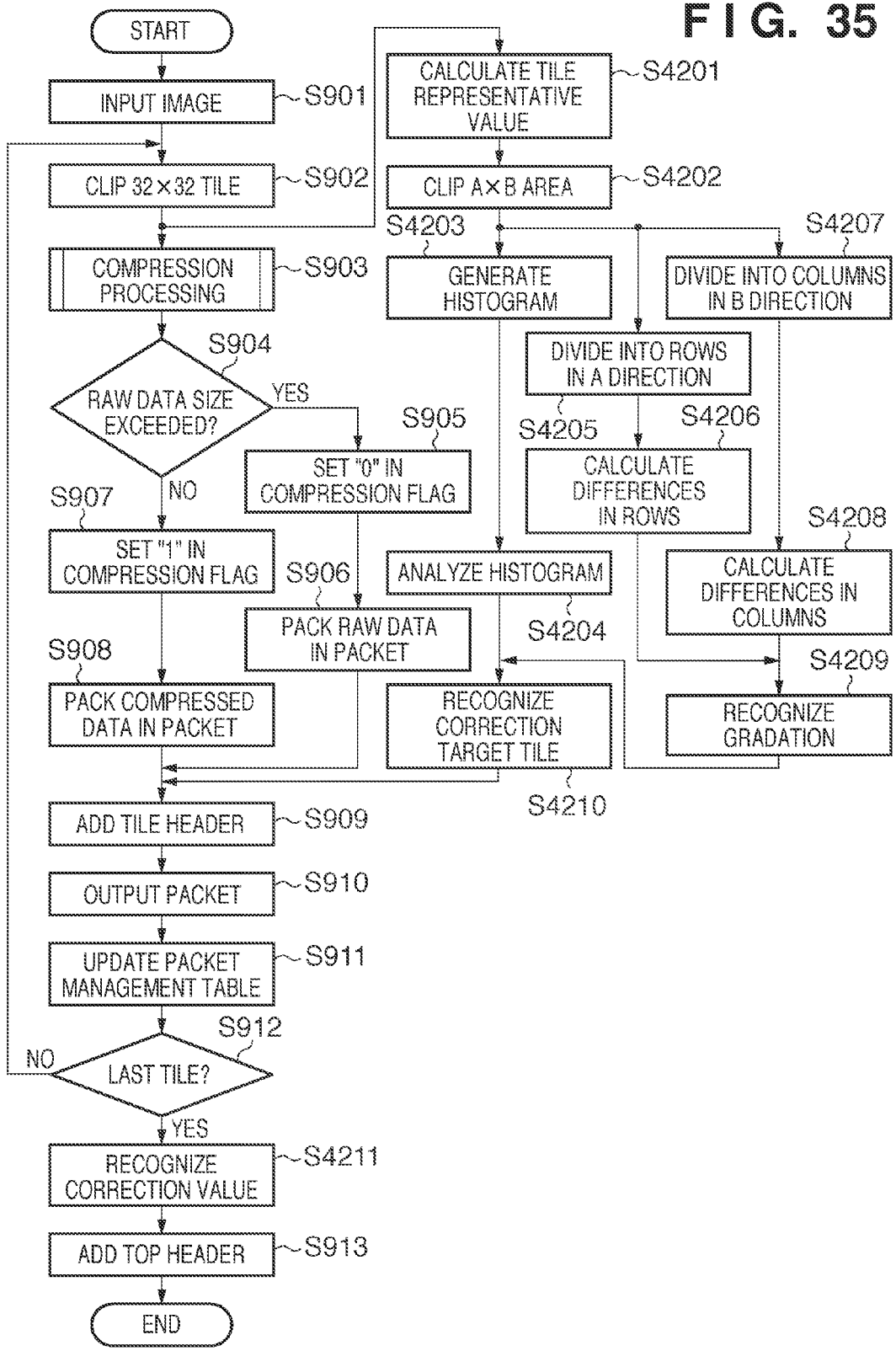
FIG. 35 is a flowchart showing the sequence of compression processing according to the third embodiment.

FIG. 35 is a flowchart of this embodiment. Since the compression processing is the same as that shown in FIG. 9, a detailed description of processes denoted by the same step numbers will not be repeated. Processes associated with pre-correction processing in this embodiment are steps S4201 to S4211.

In this embodiment, gradation recognition is done parallel to conventional histogram analysis. After a tile is clipped in step S902, a compression unit calculates a tile representative value BWave for each tile from image data in that tile (S4201). Then, the compression unit clips an A×B area (S4202). Parallel to histogram processing, the compression unit further divides the clipped A×B area into the rows in the A direction of that area, as described above using FIG. 34A (S4205). After that, the compression unit calculates differences between neighboring tile representative values BWave of the respective rows (S4206). Likewise, the compression unit further divides the clipped A×B area into the columns in the B direction of that area, as described above using FIG. 34B (S4207). After that, the compression unit calculates differences between neighboring tile representative values BWave of the respective columns (S4208).

From the calculation results for the respective rows in the A direction in step S4206, and those for the respective columns in the B direction in step S4208, the compression unit recognizes based on the aforementioned criteria whether or not the area is a gradation region (S4209). In correction target tile recognition processing (S4210), the compression unit determines based on the result of the histogram analysis (S4204) and that of the gradation recognition (S4209) whether or not a tile determined as a correction target in the histogram analysis (S4204) is a correction target. Even a tile which is determined as a correction target but is recognized as a gradation part in the gradation recognition (S4209) is determined as a non-correction target.

As a result of the above processes, the compression unit adds a tile representative value and correction target flag to a header part (S909). Then, the compression unit outputs packet data (S910). Upon completion of the processing for all tiles (YES in step S912), the compression unit calculates a correction value as in the second embodiment (S4211). Then, the compression unit adds the correction value to a Top header (S913), and outputs the Top header.

When compressed image data is saved in a memory or magnetic disk, a storage space of the Top header added at the end of the processing is assured in advance before respective packets. Then, respective packet data are stored, and the Top header which is output lastly is stored in the assured space. The sequence when the pre-compression processing of this embodiment is executed at the time of compression has been described.

Since expansion processing is the same as that in the second embodiment, a detailed description thereof will not be given in this embodiment.

As described above, whether or not a referring area is a gradation region is determined. If the referring area is determined as a gradation region, correction processing is not applied to tiles included in that gradation region. That is, even when a tile of interest is determined as a correction target in the correction target tile recognition processing (S2403) in the flowchart of FIG. 24 and in the conventional processing of a pre-correction processing unit 2500 in the block diagram of FIG. 25, that tile is determined as a non-correction target tile.

With the aforementioned processing, in addition to the effects of the first and second embodiments, any image disturbance problem caused by applying unnecessary correction to a gradation image can be prevented.

Fourth Embodiment

In the first and second embodiments, all correction processes for image data are automatically executed. However, this embodiment will explain processing for changing a correction value recognized by pre-correction processing at the time of expansion of compressed data to change a correction amount for image data, thereby changing the density and color of an even image part.

[Processing Sequence]

Figure 36:
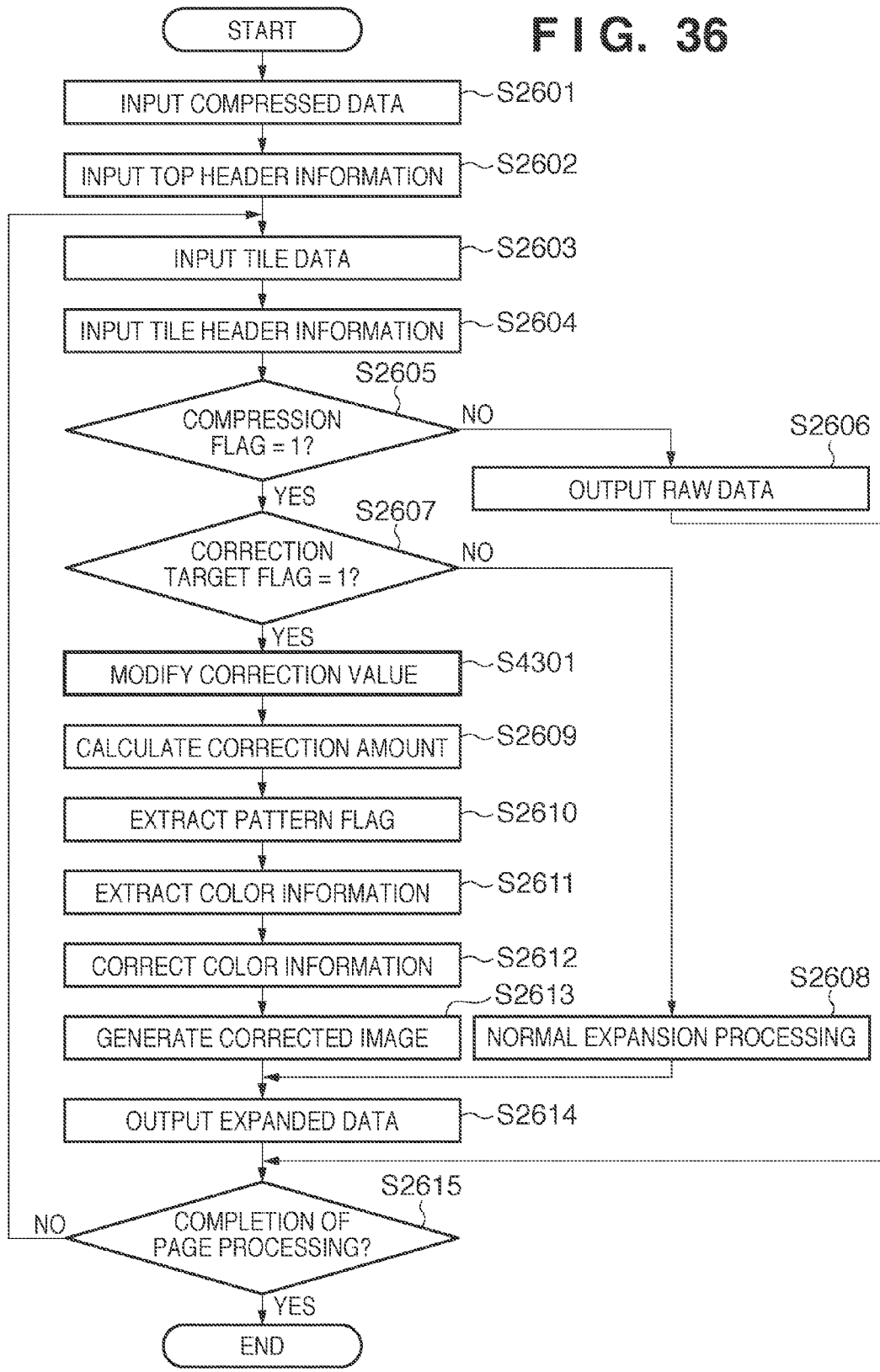
FIG. 36 is a flowchart showing the sequence of expansion processing according to the fourth embodiment.

FIG. 36 is a flowchart of this embodiment. This embodiment will explain processing associated with a grayscale image. The flowchart of FIG. 36 includes the sequence by adding correction value change processing to FIG. 26 described in the first embodiment. Hence, the same step numbers denote processes which are the same as those in the first embodiment, and a detailed description thereof will not be repeated.

As a characteristic feature of this embodiment, correction value modification processing (S4301) is executed before correction amount calculation processing (S2609). In the correction value modification processing, a correction value is changed by adding or subtracting a value designated by the user to or from a correction value BWH recognized in Top header information input processing (S2602).

More specifically, a correction value BWH recognized by the Top header information input processing (S2602) is displayed on a display of a user interface 108 of an MFP shown in FIG. 1, and the user inputs a value to be added to or subtracted from that value using an input unit such as a numeric keypad. When image data is grayscale data, the density of a correction target part is decreased by increasing the correction value BWH or is increased by decreasing that value.

When image data can be displayed on the display unit of the user interface 108, the following arrangement may be adopted. That is, expanded image data before the correction value is changed is displayed. Furthermore, expanded data after the correction value is changed by correction value change setting processing is displayed together, thus allowing the user to confirm the change effect.

[Hardware Arrangement (for Expansion Processing with Correction Value Input)]

Figure 37:
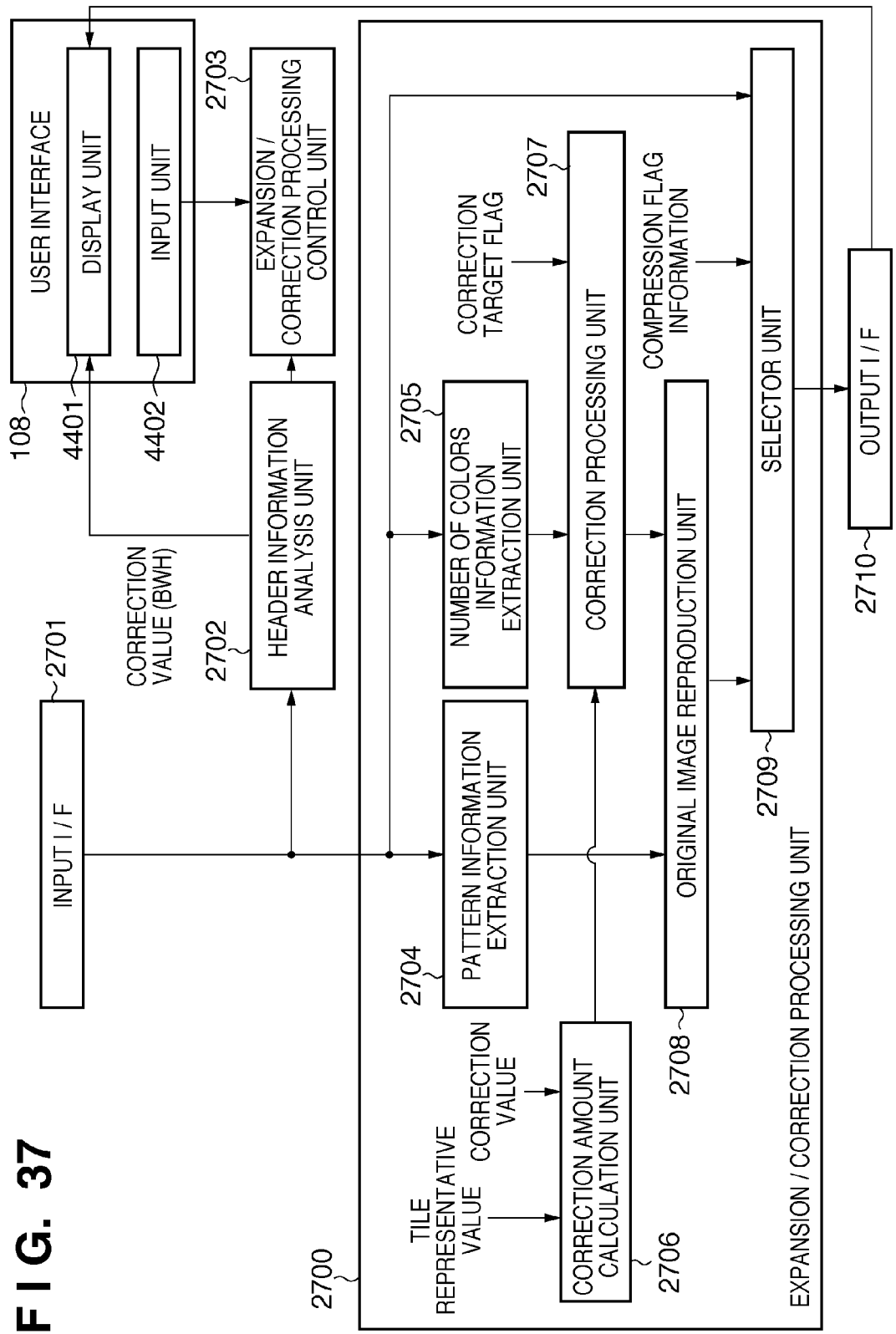
FIG. 37 is a block diagram showing the hardware arrangement for the expansion processing according to the fourth embodiment.

FIG. 37 is a block diagram showing the hardware arrangement of this embodiment. Since expansion/correction processing is the same as that in FIG. 27, a detailed description of components denoted by the same reference numerals will not be repeated.

FIG. 37 shows the arrangement in which the user interface 108 shown in FIG. 1 is connected to the hardware arrangement (FIG. 27) for the expansion/correction processing of the first embodiment. To the user interface 108 of the MFP shown in FIG. 1, a recognized correction value BWH is input from a header information analysis unit 2702. This implements a receiving unit which receives a correction value input by the user. A display unit 4401 of the user interface 108 uses, for example, a display, and displays the correction value BWH.

The user inputs a value to be added to or subtracted from the displayed correction value BWH from an input unit 4402 such as a numeric keypad. When image data can be displayed on the display unit 4401 of the user interface 108, the following arrangement may be adopted. That is, expanded image data before the correction value is changed is output from an output I/F 2710, and is displayed on the display unit 4401. When the user makes a setting to change the correction value, expanded data after the correction value is changed is alternately displayed, thus allowing the user to confirm the change effect of the correction value.

As described above, since the correction value recognized by pre-correction processing is changed at the time of expansion of compressed data, the correction amount is changed to allow the user to easily change the density and color of an even image part.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-143922, filed Jun. 24, 2010, which is hereby incorporated by reference herein in its entirety.

What is claimed is:

1. An image processing apparatus, which applies correction processing to input image data, comprising:
   a compression unit configured to compress the image data based on values of pixels and a layout of the pixels for each tile including the predetermined number of pixels;
   a representative value calculation unit configured to calculate a representative value from the values of the pixels included in the tile;
   a determination unit configured to determine based on a distribution of the representative values of tiles included in a first area including the first number of tiles whether or not a tile of interest included in the first area is to be corrected;
   a correction value calculation unit configured to calculate a correction value for the tile of interest based on the representative values of tiles included in a second area including the second number of tiles; and
   an addition unit configured to add representative values of the tiles, determination results of the tiles by said determination unit, and the correction value to the image data compressed by said compression unit.

2. The apparatus according to claim 1, further comprising an expansion unit configured to expand the compressed image data,
   wherein said expansion unit corrects the image data when said expansion unit expands the compressed image data using the representative values, the determination results by said determination unit, and the correction value, which are added to the compressed image data by said addition unit.

3. The apparatus according to claim 1, wherein said representative value calculation unit calculates, as the representative value, an average value of the values of the pixels included in the tile.

4. The apparatus according to claim 1, wherein said representative value calculation unit selects, as the representative value, a mode value from the values of the pixels included in the tile.

5. The apparatus according to claim 1, wherein when the distribution of the representative values of the tiles included in the first area falls within a predetermined range, said determination unit determines that the tile of interest is to be corrected.

6. The apparatus according to claim 1, further comprising a region determination unit configured to determine a gradation region in the input image data,
   wherein when the tile of interest is included in the gradation region, said determination unit determines that the tile of interest is not to be corrected.

7. The apparatus according to claim 6, wherein when representative values of tiles included in a region to be determined are always increasing, are always decreasing, or are constant in both a main scan direction and a sub-scan direction, said region determination unit determines that the region is the gradation region.

8. The apparatus according to claim 1, wherein the first area to be determined by said determination unit and the second area used in calculations of said correction value calculation unit are areas having the same range.

9. The apparatus according to claim 1, wherein the first area to be determined by said determination unit and the second area used in calculations of said correction value calculation unit are areas having different ranges.

10. The apparatus according to claim 1, wherein said correction value calculation unit calculates, as the correction value, an average value of representative values of tiles included in the second area.

11. The apparatus according to claim 1, wherein said correction value calculation unit calculates, as the correction value, a mode value of representative values of tiles included in the second area.

12. The apparatus according to claim 2, further comprising a receiving unit configured to receive the correction value,
   wherein said expansion unit executes expansion processing using the correction value received by said receiving unit in place of the correction value calculated by said correction value calculation unit.

13. The apparatus according to claim 1, wherein the input image data is color image data, said representative value calculation unit calculates representative values of respective color attributes from the values of the pixels included in the tile, and said correction value calculation unit calculates correction values for the respective color attributes in the tile of interest.

14. The apparatus according to claim 1, wherein the predetermined number of pixels which configure the tile is configured by 32×32 pixels.

15. A control method of an image processing apparatus, which applies correction processing to input image data, comprising:

a compression step of controlling a compression unit to compress the image data based on values of pixels and a layout of the pixels for each tile including the predetermined number of pixels;

a representative value calculation step of controlling a representative value calculation unit to calculate a representative value from the values of the pixels included in the tile;

a determination step of controlling a determination unit to determine based on a distribution of the representative values of tiles included in a first area including the first number of tiles whether or not a tile of interest included in the first area is to be corrected;

a correction value calculation step of controlling a correction value calculation unit to calculate a correction value for the tile of interest based on the representative values of tiles included in a second area including the second number of tiles; and an addition step of controlling an addition unit to add representative values of the tiles, determination results of the tiles by the determination unit, and the correction value to the image data compressed in the compression step.

16. A non-transitory computer-readable medium storing a program for controlling a computer to function as:

a compression unit configured to compress image data based on values of pixels and a layout of the pixels for each tile including the predetermined number of pixels;

a representative value calculation unit configured to calculate a representative value from the values of the pixels included in the tile;

a determination unit configured to determine based on a distribution of the representative values of tiles included in a first area including the first number of tiles whether or not a tile of interest included in the first area is to be corrected;

a correction value calculation unit configured to calculate a correction value for the tile of interest based on the representative values of tiles included in a second area including the second number of tiles; and an addition unit configured to add representative values of the tiles, determination results of the tiles by said determination unit, and the correction value to the image data compressed by said compression unit.

* * * * *